US012587530B2

(12) United States Patent
Law et al.

(10) Patent No.: US 12,587,530 B2
(45) Date of Patent: Mar. 24, 2026

(54) CLOUD ARCHITECTURE FOR ENFORCING MULTI-DIMENSIONAL DATA SECURITY USING SECURITY ASSIGNMENTS BEYOND ROLE-BASED ACCESS CONTROLS

(71) Applicant: Oracle International Corporation, Redwood Shores, CA (US)

(72) Inventors: Alvin Law, Redwood Shores, CA (US); Suraj Singh, Redwood Shores, CA (US); Kishore Kondepudi, Redwood Shores, CA (US); Satya Anur, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 109 days.

(21) Appl. No.: 18/739,776

(22) Filed: Jun. 11, 2024

(65) Prior Publication Data

US 2025/0379867 A1 Dec. 11, 2025

(51) Int. Cl.
*H04L 9/40* (2022.01)

(52) U.S. Cl.
CPC .................................. *H04L 63/101* (2013.01)

(58) Field of Classification Search
CPC ...................................................... H04L 63/101
See application file for complete search history.

(56) References Cited

U.S. PATENT DOCUMENTS 8,306,999 B2 * 11/2012 Gass, III ............. G06F 21/6227
707/802
8,458,230 B2 6/2013 Korablev et al.
(Continued)

FOREIGN PATENT DOCUMENTS

CN 115412307 A 11/2022
EP 2284701 A1 7/2014

OTHER PUBLICATIONS ibm.com, "Object access rights and security—IBM Documentation", https://www.ibm.com/docs/en/filenet-p8-platform/5.5. 12?topic+authorization-object-access-rights-security, Mar. 5, 2024.
(Continued)

*Primary Examiner* — Yonas A Bayou
(74) *Attorney, Agent, or Firm* — Invoke

(57) ABSTRACT

An object access service is implemented on a computer system for configuring and enforcing multi-dimensional data security using security assignments beyond role-based access controls. The computer system accesses a request submitted on behalf of a user for access to database structure(s). The computer system requests predicate(s) mapped to role(s) assigned to the user and stored in association with the database structure(s). Predicate(s) submitted to the database may be dynamically filled in by the database pursuant to retrieving data from the database structure(s) to reference security assignment field(s) and security assignment value(s) of the security assignment. The predicate(s) are used to retrieve a security assignment that restricts access to the database structure(s) beyond the role(s) assigned to the user. The security assignment is used to restrict data accessible from the database structure(s) to generate a result set, which is transmitted to a client consumer system for consumption via a consumer interface.

20 Claims, 8 Drawing Sheets

(56)                    References Cited

U.S. PATENT DOCUMENTS

| | | | | |
|---|---|---|---|---|
| 2005/0097353 A1* | 5/2005 | Patrick | H04L 63/20 | |
| | | | | 726/26 |
| 2005/0131583 A1* | 6/2005 | Ransom | H04L 9/3268 | |
| | | | | 726/4 |
| 2005/0177570 A1* | 8/2005 | Dutta | G06F 21/6227 | |
| | | | | 707/999.009 |
| 2008/0235231 A1* | 9/2008 | Gass | G06F 21/6227 | |
| | | | | 707/999.102 |
| 2009/0199273 A1* | 8/2009 | Yalamanchi | G06F 21/6227 | |
| | | | | 726/4 |
| 2012/0233689 A1* | 9/2012 | Korablev | G06F 21/6218 | |
| | | | | 726/17 |
| 2012/0324592 A1* | 12/2012 | Korablev | G06F 21/6218 | |
| | | | | 726/30 |
| 2018/0041511 A1* | 2/2018 | Zhu | G06F 21/316 | |
| 2024/0048592 A1* | 2/2024 | Viswanathan | H04L 63/105 | |

OTHER PUBLICATIONS

MicroStrategy, "Controlling Access to Objects: Permissions", https://www2.microstrategy.com/producthelp/current/systemadmin/webhelp/lang_1033/content/controlling_access_to_objects_permissions.htm, Mar. 5, 2024.
SAP, "Creating and Managing Data Source Connections in SAP Business Objects Business Intelligence", https://help.sap.com/docs/SAP_LUMIRA/b2ab3c5d05314085985c4b78aa17db2d/3ba4c8d572bc1014ae0faa81b0e91070.html?version=2.3.2.0&locale=en-US, Mar. 6, 2024.

* cited by examiner

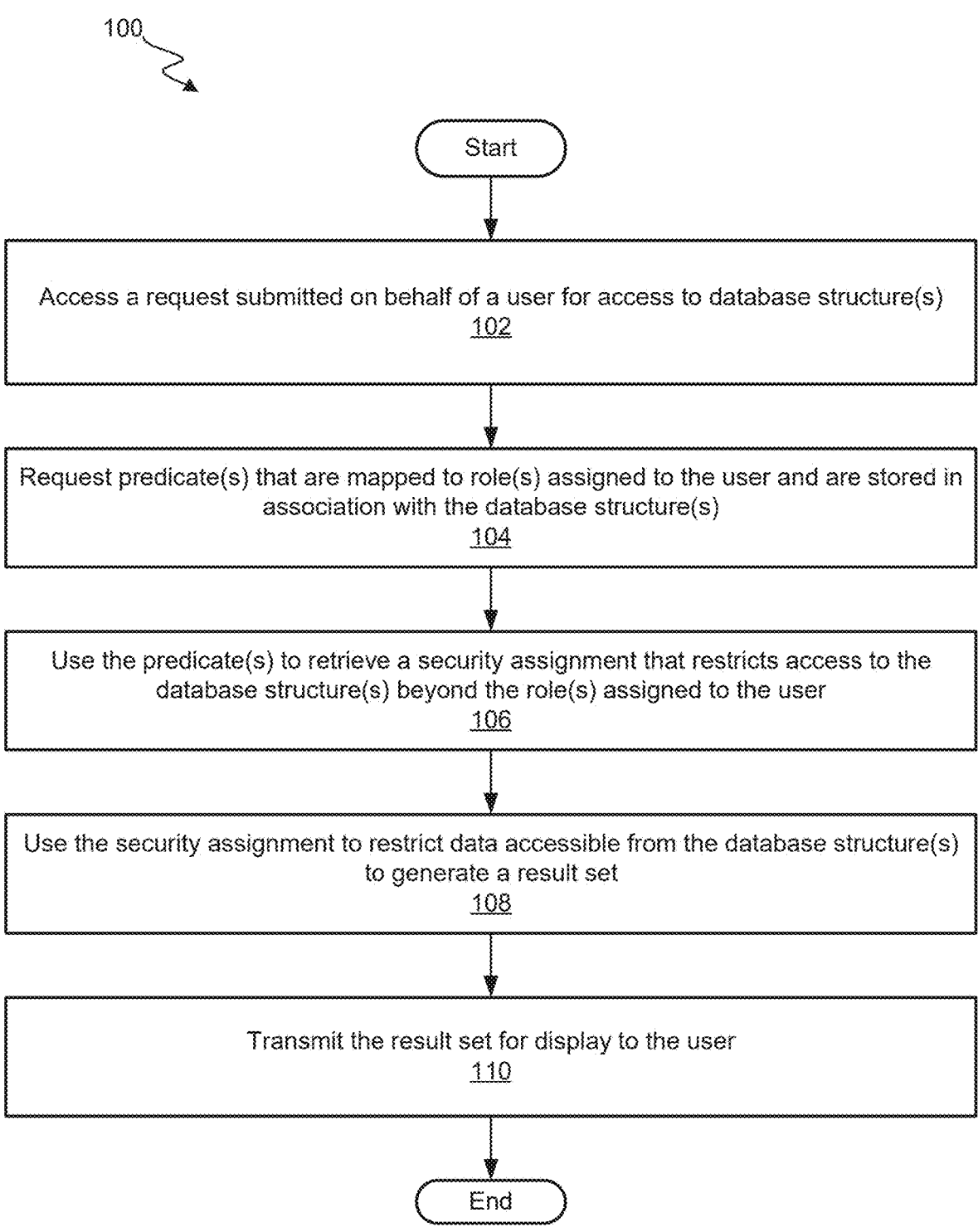

100

Start

Access a request submitted on behalf of a user for access to database structure(s)
102

Request predicate(s) that are mapped to role(s) assigned to the user and are stored in association with the database structure(s)
104

Use the predicate(s) to retrieve a security assignment that restricts access to the database structure(s) beyond the role(s) assigned to the user
106

Use the security assignment to restrict data accessible from the database structure(s) to generate a result set
108

Transmit the result set for display to the user
110

End

FIG. 1

CLOUD ARCHITECTURE FOR ENFORCING MULTI-DIMENSIONAL DATA SECURITY USING SECURITY ASSIGNMENTS BEYOND ROLE-BASED ACCESS CONTROLS

BACKGROUND

Database systems, such as systems implemented on-premises or in the cloud, may be secured behind a layer of authentication that allows a user to access data in a database. If the database implements role-based access controls, different users may have access to different database structures, and may accordingly see different results as queries are executed against those different database structures. The database system enforces role-based access controls to limit which database structures are accessible to the different users based on different roles in use by the different users.

A database security administrator may configure and maintain role-based access controls by defining roles in the database. Database roles are defined based on which database structures the roles are able to access, which types of access are allowed for the database structures (for example, read or update access), and which users are assigned to the roles. The various database structures and types of access allowed for each are stored in a policy, and the various policies corresponding to various roles applicable to a user request determine what database structures are accessible during query execution. The database system may constrain database structure access by treating portions of the query attempting to access inaccessible database structures as null or as producing an empty result set. Some database systems may return an error when a query attempts to access a database structure that is inaccessible to the user via role-based access controls.

As security constraints become more complex, the database security administrator has difficulty maintaining a web of policies that reference a variety of database structures and a variety of types of access for the variety of database structures. Nonetheless, these role-based access control policies are critical to ensuring that users do not gain access to data for which the users are not privileged. Although database security administrators may attempt to secure database structures according to plans, the complexity of the web of policies may cause database structures to be mistakenly accessible to the wrong users. In order to get application functionality to work correctly for some users, imprecise holes in role-based access control policies may be created that cause a potential for data leaks to the wrong other users.

These role-based access control complexities and data management difficulties are compounded by modular application designs that attempt to retrieve and analyze limited portions of the data for limited purposes for a variety of users. Modular application designs provide higher-level functionality for users either with much difficulty, with limited functionality to ensure that data leaks do not occur, or with little regard for the important data boundaries imposed by role-based access controls.

BRIEF SUMMARY

In some embodiments, an object access service is implemented on a computer system for configuring and enforcing multi-dimensional data security using security assignments beyond role-based access controls. The computer system accesses a request submitted on behalf of a user for access to database structure(s). The computer system requests predicate(s) mapped to role(s) assigned to the user and stored in association with the database structure(s). The predicate(s) are used to retrieve a security assignment that restricts access to the database structure(s) beyond the role(s) assigned to the user. Predicate(s) submitted to the database may be dynamically filled in by the database pursuant to retrieving data from the database structure(s) to reference security assignment field(s) and security assignment value(s) of the security assignment. The security assignment is used to restrict data accessible from the database structure(s) to generate a result set, which is transmitted for display to the user.

In one embodiment, a computer-implemented method includes accessing a user request on behalf of a user for one or more types of access to one or more database structures of a database. The computer-implemented further includes requesting, from an authorization service, one or more predicates that are persistently mapped, in one or more predicate database structures, to one or more roles persistently assigned, in a role assignment database structure, to the user and stored in association with at least one type of access of the one or more types of access and at least one database structure of the one or more database structures. The one or more predicates indicate the at least one type of access and the at least one database structure for which the one or more roles of the user provide at least one of the one or more types of access. The computer-implemented method further includes using the one or more predicates from the authorization service to retrieve, from a security assignment database structure, a security assignment for the user relative to the at least one database structure of the one or more database structures of the database. The security assignment assigns, to one or more security assignment fields, one or more security assignment values corresponding to one or more records of the at least one database structure accessible to the user. The security assignment restricts access to the at least one database structure at least in part by preventing access one or more other records that do not have the one or more security assignment values for the one or more security assignment fields. The one or more other records are otherwise accessible under the one or more roles. The computer-implemented method further includes using the at least one type of access for the at least one database structure further restricted by the security assignment, retrieving, in a database session for a base user with more access than the user, a result set from the one or more database structures at least in part by specifying one or more conditions in a query that selects data from the one or more database structures where the one or more security assignment fields match the one or more security assignment values. The one or more conditions in the query exclude data from the one or more database structures where the one or more security assignment fields do not match the one or more security assignment values. At least part of the result set may be transmitted to a client consumer system for consumption via a consumer interface.

In a further embodiment, the one or more predicates are dynamically filled in by the database in the database session for the base user with the one or more security assignment fields and the one or more security assignment values pursuant to retrieving the security assignment. The one or more conditions in the query that selects the data from the one or more database structures comprise the one or more security assignment fields and the one or more security assignment values.

In the same or a different further embodiment, the user is a first user, the user request is a first user request, the one or more types are one or more first types, the one or more predicates are one or more first predicates, the one or more roles are one or more first roles, the security assignment is a first security assignment, the one or more security assignment fields are one or more first security assignment fields, the one or more security assignment values are one or more first security assignment values, the result set is a first result set, the one or more conditions are one or more first conditions, the query is a first query, and the client device is a first client device. The computer-implemented method further includes accessing a second user request on behalf of a second user for one or more second types of access to the one or more database structures of the database. The computer-implemented method includes requesting, from the authorization service, one or more second predicates that are persistently mapped, in one or more predicate database structures, to one or more second roles persistently assigned, in the role assignment database structure, to the second user and stored in association with at least a second type of access of the one or more second types of access and at least one database structure of the one or more database structures. The one or more second predicates indicate at least the second type of access and the at least one database structure for which the one or more second roles of the second user provide at least the second type of access. The computer-implemented method further includes using the one or more second predicates from the authorization service to retrieve, from the security assignment database structure, a second security assignment for the second user relative to the at least one database structure of the one or more database structures of the database. The second security assignment assigns, to one or more second security assignment fields, one or more second security assignment values corresponding to one or more records of the at least one database structure accessible to the second user. The second security assignment restricts access to the at least one database structure at least in part by preventing access one or more other records that do not have the one or more second security assignment values for the one or more second security assignment fields. The one or more other records are otherwise accessible under the one or more second roles. The computer-implemented method further includes using at least the second type of access for the at least one database structure further restricted by the second security assignment, retrieving, in a database session for a base user with more access than the second user, a second result set from the one or more database structures at least in part by specifying one or more second conditions in a second query that selects data from the one or more database structures where the one or more second security assignment fields match the one or more second security assignment values. The one or more second conditions in the second query exclude data from the one or more database structures where the one or more second security assignment fields do not match the one or more second security assignment values. At least part of the second result set may be transmitted to a second client consumer system for consumption via a second consumer interface.

In a further embodiment, the computer-implemented method includes accessing a third user request on behalf of a third user for one or more third types of access to the one or more database structures. The computer-implemented method further includes retrieving a third result set from the one or more database structures for the third user in a third query that selects data from the one or more database structures without specifying any security assignments that restrict the third result set beyond one or more third roles of the third user. The database excludes data from the third result set based at least in part on the one or more third roles of the third user. At least part of the third result set may be transmitted to a third client consumer system for consumption via a third consumer interface.

In another embodiment, the user is a first user, the user request is a first user request, the one or more types are one or more first types, the one or more predicates are one or more first predicates, the one or more roles are one or more first roles, the security assignment is a first security assignment, the one or more security assignment fields are one or more first security assignment fields, the one or more security assignment values are one or more first security assignment values, the result set is a first result set, the one or more conditions are one or more first conditions, the query is a first query, and the client device is a first client device. The computer-implemented method further includes accessing a second user request on behalf of a second user for one or more second types of access to the one or more database structures. The computer-implemented method further includes retrieving a second result set from the one or more database structures for the second user in a second query that selects data from the one or more database structures without specifying any security assignments that restrict the second result set beyond one or more second roles of the second user. The database excludes data from the second result set based at least in part on the one or more second roles of the second user. At least part of the second result set may be transmitted to a second client consumer system for consumption via a consumer interface.

In various embodiments, the one or more types of access include create, read, update, or delete access.

In various embodiments, the security assignment database structure is modifiable by a first set of users. At least some users of the first set of users may not be permitted to modify roles persistently assigned in the database.

In various embodiments, the computer-implemented method further includes receiving, by the authorization service, a notification of a change in the database to one or more definitions of the one or more roles of the user, and, based at least in part on the notification, updating the security assignment database structure to de-activate a security assignment that is inconsistent with the change.

In an embodiment, the security assignment database structure does not include information about types of access, and the one or more predicate database structures do not include information about security assignments. The computer-implemented method further includes using the security assignment database structure and the one or more predicate database structures to persistently generate an assignment record comprising different entries for different combinations of users, types of access, and database structures. The assignment record is used to execute one or more user requests and retrieve one or more result sets.

In an embodiment, the computer-implemented method further includes causing display of a user interface for creating or modifying one or more security assignments for one or more specified users using a specified security assignment value for a specified security assignment field. The user interface does not provide an option to modify types of access that apply to the created or modified one or more security assignments. The types of access that apply to the created or modified one or more security assignments are determined by roles persistently assigned in the database to the one or more specified users.

In an embodiment, the computer-implemented method further includes causing display of a user interface for managing different security assignments. At least some of the different security assignments include different specified users, different specified security assignment fields, different specified security assignment values, and different specified roles. The different security assignments do not specify which database structures are accessible to the different specified roles. The different security assignments do not specify which types of access are allowable for the one or more database structures that are accessible to the different specified roles. The one or more database structures that are accessible to the different specified roles and the one or more types of access that are allowable for the one or more database structures that are accessible to the different specified roles are determined by roles persistently assigned in the database to the different specified users.

In an embodiment, the one or more database structures include the at least one database structure for which access is managed by the one or more roles and the security assignment and at least one other database structure for which access is managed by the one or more roles and not security assignments. Rows of the at least one other database structure are accessible without a security assignment granting access to the rows of the at least one other database structure. Rows of the at least one database structure are not accessible without a security assignment granting access to the rows of the at least one database structure. The one or more predicate database structures are stored as metadata for the at least one database structure.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources, or otherwise computer-implemented. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 1 illustrates a flow chart showing an example process for enforcing multi-dimensional data security using security assignments beyond role-based access controls.

DETAILED DESCRIPTION

Figure 2:
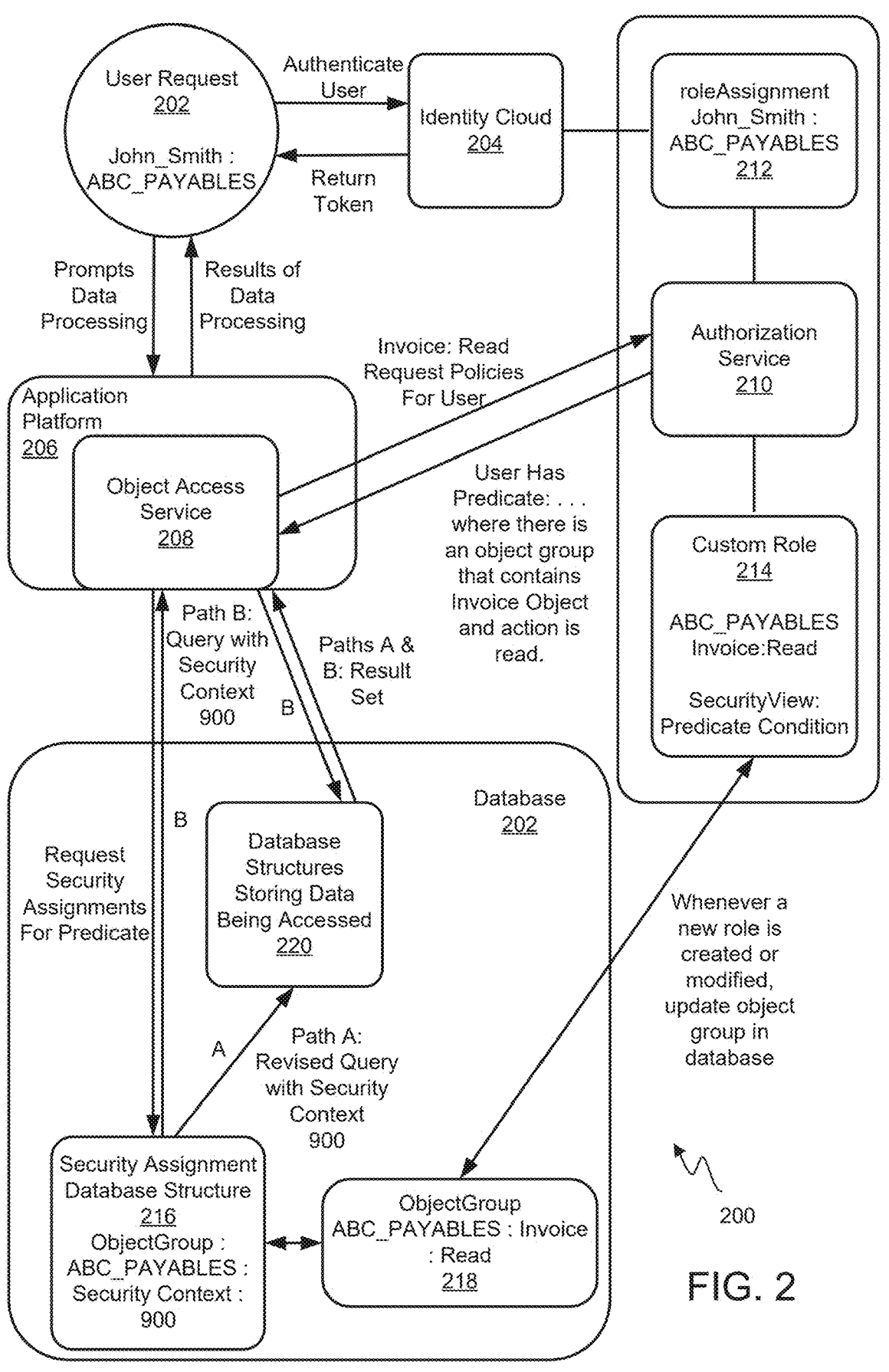
FIG. 2 illustrates a diagram showing an example system for enforcing multi-dimensional data security using security assignments beyond role-based access controls.

An object access service is implemented on a computer system for configuring and enforcing multi-dimensional data security using security assignments beyond role-based access controls. In processing a request on behalf of a user, the computer system uses predicate(s) to retrieve a security assignment that restricts access to database structure(s) beyond role(s) assigned to the user. Predicate(s) submitted to the database may be dynamically filled in by the database pursuant to retrieving data from the database structure(s) to reference security assignment field(s) and security assignment value(s) of the security assignment. The security assignment is used to restrict data accessible from the database structure(s) to generate a result set.

In various embodiments, techniques for configuring and enforcing multi-dimensional data security using security assignments beyond role-based access controls are implemented using non-transitory computer-readable storage media to store instructions which, when executed by one or more processors of a computer system, cause configuring security assignments, receiving user input, applying security assignments, generating a result set, and/or displaying or integrating results that are based on the result set. The techniques may be implemented on a local or cloud-based computer system that includes processors, and interface for processing requests, and a database for transforming queries using the predicate(s) and also enforcing role-based access controls. The computer system may communicate with consumer systems such as a client browser on a client device or another client system for displaying or integrating results based at least in part on the result sets.

A description of configuring and enforcing multi-dimensional data security using security assignments beyond role-based access controls is provided in the following sections:

AUTHENTICATION AND PROVIDING MULTIDIMENSIONAL DATA ACCESS TO DIFFERENT USERS OR ON BEHALF OF DIFFERENT USERS

CONFIGURING SECURITY ASSIGNMENTS CONSISTENT WITH ROLES

USING SECURITY ASSIGNMENTS TO RESTRICT DATA BEYOND ROLE-BASED ACCESS CONTROLS

COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Authentication and Providing Multidimensional Data Access to Different Users or on Behalf of Different Users Identity management services provide a boundary to a cloud environment that ensures cloud users are identified and treated with the appropriate data restrictions as they interact with resources in the cloud. A user may connect with the identity management service by interacting with an interface, such as a user interface in a browser, a command-line interface, or by using a device that makes use of an application programming interface. The interface may prompt the user, application, or device for credentials, such as a password, key, token, certificate, or other credential, and the identity management service may determine whether the provided credentials are accurately mapped to credentials expected for the user.

If the credentials are correct for the user, the user may gain access, via the identity cloud service, to various resources in the cloud. For example, the identity management service may provide a token or other credential that allows limited access to an application or database resource in the cloud. The token may be bound by time constraints, such as being valid during a time window with an option for the identity management service to keep the token alive for longer, by access constraints such as being valid for certain applications, databases, or database structures but not for other applications, databases, or database structures. In some embodiments, various tokens are generated for authentication of the user with various applications, such that one application cannot re-use a provided token to obtain unauthorized access to another application.

In one example, identity credentials are linked to role information by a central identity system like an Open Authorization (OAUTH)-based system such as IDCS (Oracle® Identity Cloud Service). The central identity system connects user sessions with relevant role information and establishes access token(s) that allow the user session to be passed to relevant applications or services in the cloud.

A user that has been authenticated into an application may use the application for a variety of purposes. The application may provide functionality that is not dependent on private data, and/or the application may provide functionality that is dependent on private data. If a user has been authenticated and cleared to use functionality that is dependent on private data, the user access to the private data is also managed to ensure that the user obtains access to the private data that has been designated for access by the user and not obtain access to any private data that has not been designated for access by the user.

A database system uses role-based access control to guard against unauthorized data access by users. Roles are defined in the database to allow different users to have access to different database structures. When using an application that is dependent on private data, different users of the application may accordingly see different results as queries are executed against those different database structures. The database system enforces role-based access controls to limit which database structures are accessible to the different users based on different roles in use by the different users.

For example, a role of a first user may allow access to some database structures but not to other database structures. A role of a second user may have access to more, fewer, or otherwise a different set of database structures than the role of the first user. By enforcing the access allowed by the roles, the database system prevents users from accessing data that the users are not supposed to have access to.

If a user has not been authenticated into an application or database, the user does not gain access to the roles mapped to the user account. For example, a user who is not authenticated with roles available for use might not even see that certain database structures exist if those database structures are inaccessible without having those roles available for use. An unauthenticated user can often obtain little or no functionality from the database or application if that functionality is dependent on private data.

Application developers benefit from users being able to perform tasks designed to be supported by the application. Some applications support limited purpose-driven tasks that are intended to provide specific functionality with low overhead so the user may take advantage of the functionality, consume results, and proceed to interact with other applications and perform other tasks.

An application or application platform (e.g., a service supporting multiple applications) may perform a variety of tasks for a same user, and the application or application platform may keep the user logged in to the database with the same user-specific database session as the various tasks are completed, taking advantage of the user roles to ensure data security. If the application supports multiple users to perform a variety of tasks, passing user authentication tokens and establishing new database sessions to perform each task can be cumbersome on both the application and the database. For example, in an application session with an application, the application may have already established that a particular user has access to a database structure in a database session with the database, and the application may have even accessed that database structure on behalf of the particular user.

If other users are also using the application, the application may perform tasks for the other users intermittently and return to performing tasks for the particular user. Rather than re-authenticating the particular user to the database, the application may use the application's prior knowledge of the particular user's access to the database structure to continue accessing the database structure on behalf of the particular user. If the application needs additional data from the accessible database structure, the application may retrieve that data using a base user account such as an application user or a super user that has access to the database structure as well as potentially other database structures that are inaccessible to the user. The application may perform limited functionality ensuring that only the database structure(s) accessible to the particular user are used to carry out requests for the particular user.

In one embodiment, each service or application provides access to data to perform data-dependent functionality via an application programming interface (API) such as a stateless representational state transfer (REST) API. User's role information, which is used for role-based access control, is verified by the identity system and passed to the application system as a potentially opaque consumable token or other authorization object for use with the database. The REST API may be accessed by a base user account such as an application user account with extended privileges, and results from the REST API may be restricted by the application.

Even if the application or application platform optimizes query execution by using prior knowledge of the accessibility of different database structures to different users, the application or application platform is limited to defining data access boundaries that are consistent with the roles defined in the database. If an application developer would like to give a user limited access to a data set to enrich the user's experience with the application, even though the user actually has broader access to the data set, the application developer may implement custom data boundaries defined by application code that causes different data to be displayed in different scenarios to different users. As the number of different users and scenarios increase, managing these custom data scenarios becomes increasingly complex and difficult to manage with application developer code.

As an alternative to custom code, the application may maintain application-side privileges that are used instead of roles. Maintaining application-side privileges does not allow the application to take advantage of database roles that ensure data security and prevent data leaks. The application-side privileges may be used to filter out data that should not be accessible to an individual user as an application accesses the data in a more privileged database session that is initially able to retrieve the inaccessible data before filtering the data out. This architecture relies on the application design to continue filtering out the right data for the right users and does not have any visibility into role changes that occur in the database to reflect changes in data security strategies. As a result, enforcing data privileges on the application side carries a risk that data will be exposed to the wrong user, or that too much data is exposed to a user.

In one example, an application may operate with a default rule with custom roles specifying that all users having a regional role get access to only those data records marked with their region unless they have a different role such as a global or administrative role or roles of multiple regions. This mode makes it difficult to override default responsibilities, for example, if someone takes a vacation, needs to fill in for someone else, or takes on additional responsibilities but not necessarily global responsibilities. Maintenance of these custom roles would be difficult because not only would the role need to be specified up-front, but the customization of the role would need to be remembered and removed when access is no longer needed.

In another example, the application may operate with the database as a superuser or a base user with expanded access and privileges, and the application has access control settings that the application enforces and does not take advantage of the role feature in the database. The application retrieves all data and removes data based on application-side rules that are configurable, possibly even after the result sets have been retrieved. In this example, the application does not get to take advantage of database roles and poses security risks as those roles are changed.

In various embodiments described herein, the application may take advantage of the database roles and extend the granularity of data access with security assignments. There is nothing in the security assignments that can expand the access rights of the user beyond the roles but only to further restrict the user in terms of what data can be accessed within the corresponding objects. People who are database security administrators may be able to configure the roles. People who are not necessarily back-end database security administrators may be able to configure the security assignments as application security administrators due to the restrictions already placed on the users by use of the roles. In other words, the security of the system may be managed using the roles by the limited set of database security administrators, while the security assignments may be more freely configured by a larger set of application security administrators without fear that a user will gain access to data that the user is not intended to access but while still being able to customize their experience in the user interface by limiting the data rows users can see when carrying our tasks on user interfaces. If security assignments attempt to give access to too much data, a user gains access to at most the data rows that they are supposed to be able to access based on their database roles. Security assignments also give users the ability to customize experiences with low risk, which allows experiences to be customized to finer granularity without needing to test and hard-code the complexity of the roles where incorrect configurations risk data breach or may have legal implications.

In one embodiment, an application maintains role-consistent security assignments that define fine-grained data access differences among users while still preserving role-based access controls. The role-consistent security assignments may be created after verifying consistency with user roles, updated as user roles change or as user-to-role assignments change, and may be defined with different levels of granularity and specificity than roles. For example, the role definitions may include a role name or other role identifier, one or more database structures impacted by the role, and one or more data access types allowed for the one or more database structures by the role. A single role may include a variety of different data access types (e.g., create, read, update, delete, and the like) specific to a variety of different database structures (e.g., different tables or objects that store data in the database). On the other hand, a role-consistent security assignment (hereinafter "security assignment") may be consistent with the roles in that the security assignment does not grant access to more data than is otherwise allowed by the roles, but the security assignment may further restrict data access beyond the roles for individual users. For example, the security assignment may specify a role, which may be linked to a group of database structures via a role-to-object assignment table on the back-end and/or may use a naming convention that assures object group names match with corresponding roles, or may specify a group of one or more objects more generally that are not perfectly aligned with existing roles. The security assignment may also specify a user and a security assignment field and value that must be satisfied for a data record to be accessible to the user.

The security assignment field may be a division, region, data domain, facility, or other data characteristic that is defined to be accessible to a given user. The security assignment values may correspond to different divisions, regions, data domains facilities, or other data characteristics for which some users have access granted by security assignments and other users do not have access granted by the security assignments. Records that are not defined to be accessible to the given user are not accessible to the given user even if the records would be otherwise accessible according to the user's role using role-based access controls. In this manner, the security assignments are said to be role-consistent but may further restrict access beyond the roles to prevent users from accessing data that may be irrelevant to the user for a given user interface or application-centric purpose, even if the user's role otherwise has access to such data in the database.

In this manner, a user interface may invoke a particular role to access data from one or more database structures on behalf of users of the interface. When a particular user is logged into an application, the database structure being accessed may require any of one or more roles for role-based access. If the particular user has any of the one or more roles, any security assignment defined for the user and corresponding role(s) applicable to any data requested by the user may be applied to further restrict which parts of the database structure are accessible to the particular user. The security assignment(s) may each specify security assignment value(s) of security assignment field(s) that must be present in rows of the database structure in order for the rows to be included in a result set for the particular user.

In this manner, the application may cause different sets of data to be accessible to the same user in different user interfaces by defining user-specific security contexts that apply different restrictions, involving different security assignment fields and different values, to different users and different roles (e.g., via object groups corresponding to the roles). The application may further restrict which roles may be used to access data for a given user interface. For example, for a specific supply chain interface involving an analysis of resources available in a factory, the resources shown may be limited to a work location of the user in a factory_worker role, even if the user also has other roles that provide more access to data. For example, the user interface could use the factory_worker role to evaluate data access even though the user is also an application security administrator or another user with elevated privileges. The factory_worker role may be further constrained by a security assignment that limits the data shown only to the work location of the user in the factory_worker role, resulting in a consistent user interface experience for all factory workers, whether or not the factory workers have elevated privileges when interacting with other user interfaces or otherwise serve in other capacities.

In one example, the user interface shows data from an Invoices database structure to different users with security assignments specifying that a Payables manager in Redwood City, California, USA should only be able to work with Invoices for USA Division while a manager in Hyderabad, Telangana, India should only be able to work for Invoices for India Division. The security assignments may be specified on a user-by-user basis, and security assignments may be created for new users as the users are created. For example, security assignments may be created for all users having a certain role, and the security assignment may assign a security assignment value from a user's record to a security assignment field. For example, this allows the Work Country field to cause different security assignments to be created on creation of a first user (e.g., a user with Work Country=US) having a particular role in a first country (US) and a second user (e.g., having work country=IN) having the particular role in a second country (IN). In the example, the security assignment for the first user may use a field other than work country, such as "division," and have a value assigned as "US" or another value derived from the work country value (e.g., "United Stated" or "West" as mapped from the work country value "US"), and the security assignment for the second user may also use the division field and have the value "IN" or another value derived from the work country value assigned (e.g., "India" or "East" as mapped from the work country value "IN") to the division field.

Configuring Security Assignments Consistent With Roles

Organizations use applications and applications platforms to interact with data via application-managed objects such as Invoices, Receipts, Assets, Ledgers, Production Logs, Incidents, Errors, etc. An object may control which data records are accessible via data security. An application-managed object is an object for which an application or application platform specifies, in the object or in association with the object, a data access path that involves checking for security assignments that potentially restrict access to the object beyond the access restricted by roles. Using data security, the application or platform and database provide coordinated functionality that allows different sets of data to be assigned to different users. For example, an employee or self-service user can only manage his/her own expense report. However, a manager can review and update some aspects of team members' expense report, and an expense auditor can review expenses across a division potentially including many teams. Users may be assigned access to a number of data-secured objects using a security assignment such as Division, Ledger, Asset Book, or any other security assignment field that can be assigned a security assignment value. The application or application platform may provide support for data security through Manage Data Access (MDA) for users, which enables the user to perform the data sub-setting based on the security assignment (e.g. Division, Ledger, Asset Book, etc.) for a given object.

In one example application, Oracle Fusion ERP® is a Java EE application based on Oracle® ADF and Weblogic®. The application may be a stateful application such that data security is based on a role-based access control model (RBAC) against a security assignment.

In various embodiments, the security assignments and RBAC work in coordination to provide create, read, update, or delete access types on a database-structure-by-database-structure basis and a user-by-user basis, such that different database structures may have different access types for same or different users and/or different users may have different access types for same or different database structures.

The security assignments may be stored in a security assignment database structure that is separate from a role-based access control database structure. The security assignment database structure may include information about the roles or corresponding group of objects mapped to the roles (e.g., those database structures for which the roles impact access) and users impacted by the security assignments and the security assignment fields and values that are used to determine access according to the security assignment. In various embodiments, the security assignment database structure may omit information about the individual database structures impacted by the security assignment, as such information may be determined from a group of objects mapped to the corresponding role, and the role may be managed in the role-based access control database structures. The security assignment database structure may also omit information about the access types allowed by the security assignment, with an implication that omission of access types implies all access types otherwise available under the role-based access control database structures are also available for the security assignment. Omitting the individual database structures and/or access types may improve useability of the security assignment database structure by omitting details that are unnecessary to distinguish between users in different divisions or regions that should have access, whatever that access may be, specific to their division or region.

In one embodiment, the application platform ensures, during creation and management of security assignments in the security assignment database structure, that security assignments are consistent with existing roles in the database in the sense that the security assignments restrict data access beyond the roles but do not refer to a user-role pairing that does not also exist in the role assignment database structure of the database. As changes are made to the roles or role assignments, security assignments may be updated to remove any security assignments that are inconsistent with the changes. For example, the security assignments relating to an object group that corresponds with the role may be updated based on a change to the role or a change to an assignment involving the role. In a particular example, notifications or updates may be communicated to the application platform on changes to the roles or role assignments, and the notifications may trigger responsive action with respect to the security assignments. Any inconsistent security assignments may be deleted or otherwise de-activated to further ensure the inconsistent security assignments are not used by the application platform. Also, changes made to the security assignments may be checked on change to ensure that they are consistent with the roles and role assignments in the database.

Due to this split management of roles and security assignments, the security assignment database structure may be managed by a same, partially overlapping, or completely different group of users than the role-based access control database structures in the database. The security assignment database structure may be modifiable by a first set of users, and the role-based access control database structures in the database may be modifiable by a second set of users that is at least partially different from the first set of users. In other words, at least some of the first set of users may not be permitted to modify roles persistently assigned in the database, and/or at least some of the second set of users may not be permitted to modify security assignments assigned by the application platform and persisted, for example, in the database.

The security assignments are fine-grained (division specific, region specific, factory specific, etc.) and managed by the application to provide users with less access than the underlying role, and roles are managed by the database at a higher-level to ensure data security within an organization.

Each application-managed object (e.g., invoices, production logs, or incidents) may have one or more security assignments stored in association with a role (e.g., via an object group mapped to the role) that controls access to the object (e.g., belonging to the object group). The security assignment may assign a particular user or group of users and role or group of roles to be able to access a subset of data from the object (e.g., records of the object) that matches the security assignment value for the security assignment field. Any record that matches the security assignment value for the security assignment field or complex logic of security assignment values for security assignment fields will end up in a result set for the particular user or group of users impacted by the security assignment.

The security assignments may be modifiable and selectable on a user interface for managing the security assignments separately from managing roles themselves. In an example, the application interface may be configured with a security assignment that allows User1 with Role1 to access certain functionality, as defined by security field and value assignments that specify which data set the user may access. This can be specified in multiple rows of security assignments with same or different role (e.g., identified via an object group mapped to the role) and a same or different security assignments on each row. The role involved in the specified security assignment is the role that controls the data access in the UI, such that the data access constraints of the role are narrowed down for the specific user with that role. A same user accessing a first UI may have access controlled by a first role, and a second UI may have access controlled by a second role, and access from either of those roles may be narrowed down based on the security assignments applicable to the corresponding role. The role involved in the specified security assignment is the role that controls the data access in the UI, such that the data access constraints of the role are narrowed down for the user by the security assignment.

In the user interface for creating or modifying security assignments, the interface presents the user with an option to select a dropdown of different available or frequently used security assignment fields or to type in a field, and the security assignment value can be typed in or selected, for example, if there are a discrete number of possible security assignment values available for a given security assignment field, such as a number small enough (5-10 or 5-20) to be included in a dropdown menu. The user may select multiple security assignment fields and values on a single row, optionally combined according to logic (e.g., AND, OR, NOT, NAND, NOR), to give the specified user open-ended access (within role-based access controls, whatever they may be) to some divisions but not others. For example, multiple divisions may be specified together in a disjunctive (OR) delimited format (e.g., comma-separated or spaced). In another example, a security assignment may be based on a conjunctive (AND) condition, such as a specific division with invoices in a particular category (e.g., "(division="East") AND (category="Sporting Goods")").

If the security assignments are specified as separate rows, the application may frame a runtime query by referencing the rows of security assignments each as a condition in, for example, a where clause of the query. The separate conditions may be disjunctive, such that a user receives more access if granted varying access by more security assignments. For example, the query may select all (*) from invoice where the division field is a specified value. If one row represents multiple divisions, the rows may be parsed or read as separate assignments for framing the conditions placed on the runtime query. In one embodiment, there are limited security stripes that can be assigned to different factory roles such that not all fields are available to be used in security assignments. For example, object groups may be created to correspond to certain roles (e.g., by being mapped to the roles), and these object groups may be managed in parallel with the corresponding roles. With a discrete number of selectable fields and security assignments, the application security administrator's user experience with the application may be improved.

In one embodiment, the user interface for creating or modifying security assignments allows different assignments to be created or modified corresponding to different roles (via object groups that are mapped to the roles), users, fields, and values. At least some of the different security assignments may include different specified users, different specified security assignment fields, different specified security assignment values, and/or different specified roles or different object groups corresponding to the different roles. The different security assignments might not specify which individual database structures are accessible to the different specified roles, as such information is managed by the role-based access controls of the database and may be maintained in an object group mapping table that maps the name of the role to the objects managed by the role. The different security assignments might also not specify which types of access are allowable for the database structures that are accessible to the different specified roles, as such information is also managed by the role-based access controls of the database.

In one embodiment, a user gets access via a role primarily for objects that are not managed with security assignments. Once security assignments are specified for an object, access to rows of the object may be restricted based on the security assignments specified in the security assignment database structure. For objects managed by security assignments, in one embodiment, users do not have access to any rows of the object, even if otherwise granted by the user's corresponding role, unless the access is given by a security assignment in the security assignment database structure. The roles provide functional security by allowing a user to perform an operation against a database structure, such as an invoices database structure. The security assignments provide data security by determining what the user is able to access when the operation is performed against the corresponding database structure.

If a new user is added to the system with particular role(s), the user may not be able to access any data unless such data access rights have been also granted in corresponding security assignments for the user. Application security administrators may create security assignments when users are added to the system, when certain roles are newly assigned to users, and/or when certain events happen (e.g., a new billing cycle gets triggered and/or the billing cycle gets closed, and/or a new incident occurs and/or the new incident is resolved). For example, a new user created with a particular role may be granted, by the application security administrator, access to a region that corresponds to their office region. As another example, a new user created with a certain job title may receive, from the application security administrator, access to a functional subset of object data that corresponds to their specific job function as determined from a value on a field of their user record mapped to value(s) of a field on accessible data records. These security assignments may allow users to gain access to objects the users would otherwise be unable to access even though the corresponding roles are already in place to grant access to the objects.

If an object is not enabled for management by security assignments, or security assignments are otherwise not enforced for the object, a new user may have access to anything provided by the role(s) assigned to the new user. For example, the role may indicate that the user can read invoices but not what invoices the user can read.

Some objects under roles may be controlled by security assignments, and other objects under roles may not be controlled by security assignments. When the user navigates to a page for which data access is managed by security assignments, if they have not been assigned access by a security assignment, the user will see the page but not any data. In this example, the object used by the page has not been granted access to the user via a security assignment. The page can bypass the security assignment by not referencing an object managed by security assignments. In this example, the page will show data, but the data may not be customized for the user beyond the access types provided by the role-based access controls.

UI pages request data objects from the database to show on the screen, and, in the process, the system checks whether (a) the user has access to the object according to the role(s) checked and managed by the database, and (b) what subset of data they have access to according to the security assignment(s). If the user does not have access to the object, the user may receive a data authorization error. If the user has access to the object but does not have access to any data in the object, the user may receive a blank result or have no data returned.

In one embodiment, the security assignment database structure does not include any information about types of access, and role-based access control database structures do not include information about security assignments. In this sense, neither database structure provides complete information about what data can be accessed by a user. A particular role-based access control database structure may store role information for a user logged into an application session, and the role information may indicate to which roles the user is mapped, to which database structures the roles are mapped, and what types of access are allowed for the database structures to which the roles are mapped.

In one embodiment, a user interface for creating and modifying security assignments hides the complexity of database structures and types of access to those database structures. The security assignment database structure and corresponding application logic might not even be aware, on the back end, of the underlying complexity which may be managed by the database role-based access controls. In this embodiment, a configuration user interface provides options to create or modify security assignment(s) for specified user(s) using a specified security assignment value for a specified security assignment field. The security assignment(s) may be stored in the security assignment database structure, and the user interface might not provide an option, indication, or any information relating to types of access that apply to the created or modified one or more security assignments. The types of access that apply to the created or modified security assignment(s) are instead determined by roles persistently assigned in the database to the specified users.

An application platform may provide an authorization service that consumes the role information to provide a service for guiding a data access query, via providing a predicate for the query, on which security assignments should apply conditions to the query. The application platform may determine, based on which roles are applicable to the user and which object(s) are validly, consistent with role assignments, attempted to be accessed by the user. The application platform may then pass information to the database in the form of a query that requests data from the database consistent with the role assignments with a predicate that requests extra conditions specified by security assignments corresponding to the user and role(s) being used to access the data. The information (e.g. a predicate) passed to the database references the security assignments database structure, and the database uses the information to retrieve corresponding security assignments that match the roles and database structures being accessed. The security assignments are used to insert the security assignment field and value condition(s) as predicate(s) to the data access query, which is executed against the database along with the predicate(s) dynamically filled in with the security assignment(s).

In this manner, security assignment records that are specified by application security administrators in a security assignment user interface may be used to execute requests to retrieve result sets from the database for users of other application user interfaces, consistent with role information that is established by the users' verified identities for the application sessions and the roles assigned to the users.

Figure 3:
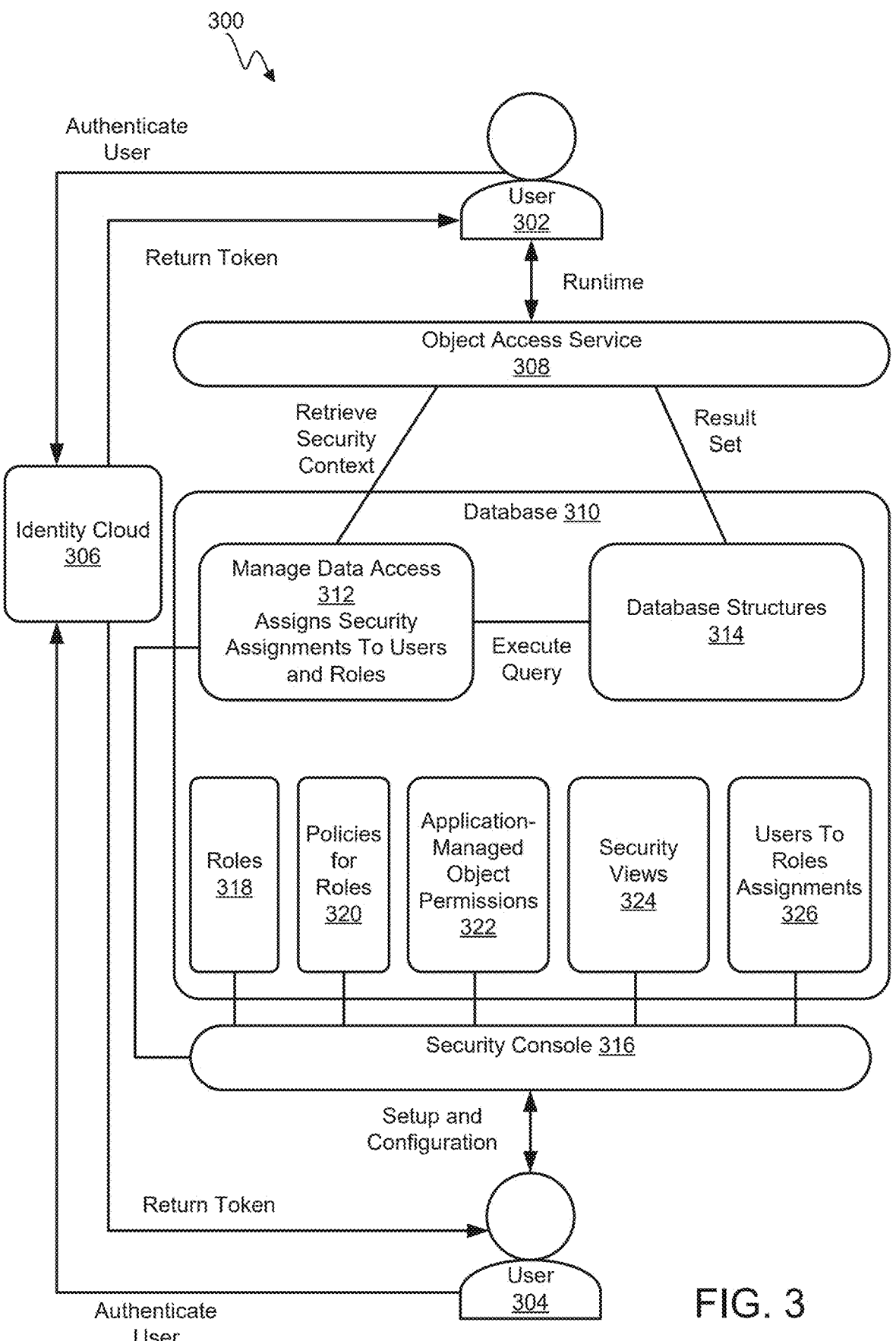
FIG. 3 illustrates a diagram showing an example system for configuring and enforcing multi-dimensional data security using security assignments beyond role-based access controls.

FIG. 3 illustrates a diagram showing an example system 300 for configuring and enforcing multi-dimensional data security using security assignments beyond role-based access controls. As shown, user 304 interacts with security console 316 for setup and configuration of roles 318, policies for roles 320, application-managed object permissions 322, security views 324, and users to roles assignments 326. Security console 316 may also be used to configure manage data access 312, which assigns security assignments to users and roles. User 304 authenticates via identity cloud 306 to interact with security console with privileges to see configurations and make changes to configurations.

FIG. 3 also shows user 302, which authenticates with identity cloud 306 to interact with object access service 308 during runtime. As shown, user 302 interacts with object access service 308 to trigger a query that retrieves security assignments from manage data access 312 of database 310, executes the query with additional conditions retrieved from manage data access 312 against database structures 314, and returns a result set for presentation to user 302.

Figure 5:
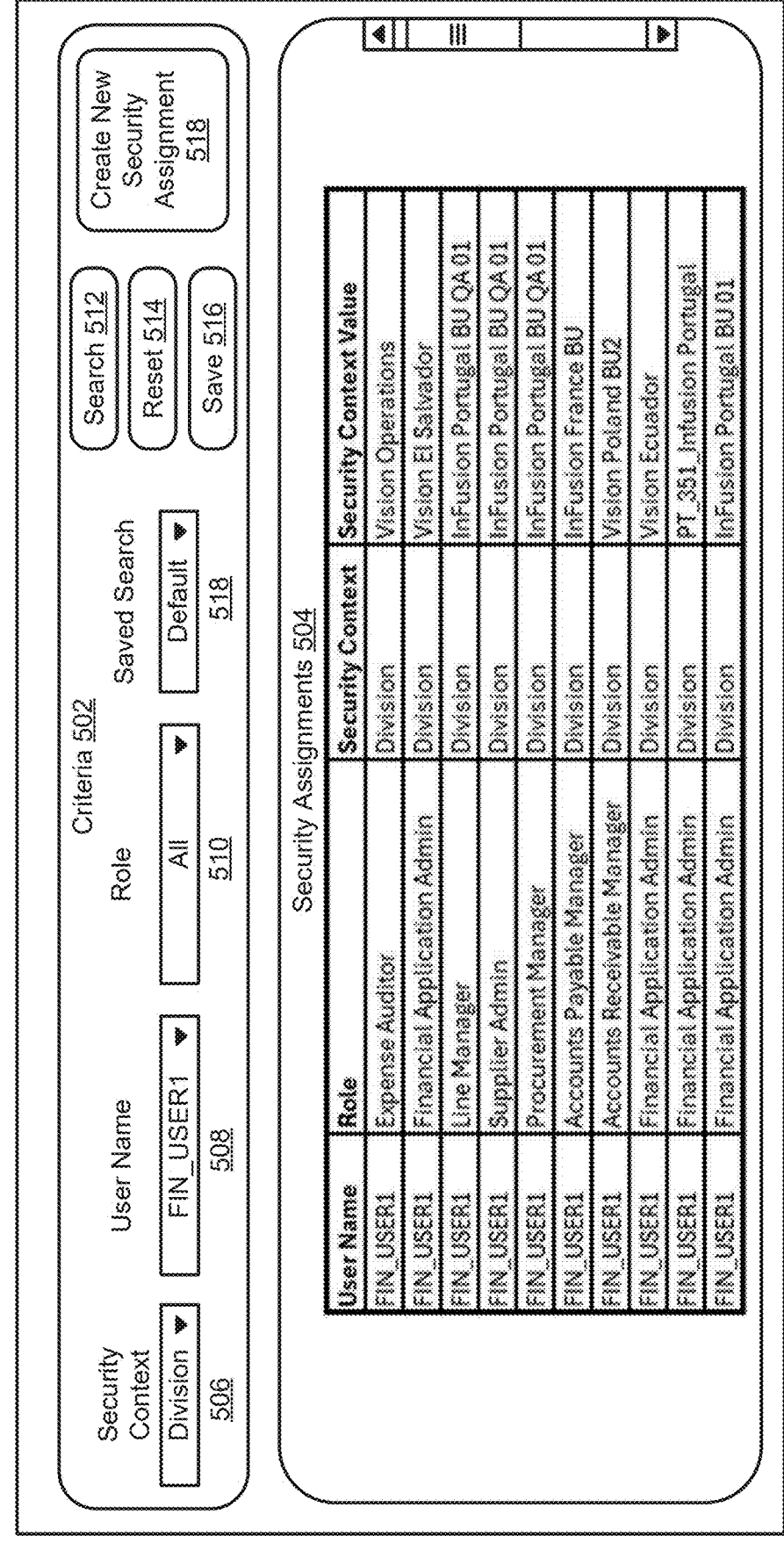
FIG. 5 illustrates a diagram of an example user interface for configuring security assignments beyond role-based access controls.

FIG. 5 illustrates a diagram of an example user interface 500 for configuring security assignments beyond role-based access controls. As shown, user interface 500 shows security assignments 504 resulting from a search. Security assignments 504 may be selected and edited to determine which rows of data are available when corresponding users (e.g., FIN_USER1 in the example) interact with the system. Criteria 502 may be provided to guide a search for relevant security assignments to modify, or to create a new security assignment by further providing a security assignment field (shown as "security context" in the example) and security assignment value (shown as "security context value" in the example). Criteria may include, but is not limited to, a security context field 506, a user name 508, a specified role 510, or named saved search criteria 518. Once criteria 502 has been specified, a configuring user may search using button 512, save search criteria using button 516, or reset the criteria to a default setting using button 514. At any time, the application allows selection of button 518 to create a new security assignment, in which case the user is further prompted for security assignment field(s) and value(s) for a specified user, and optionally logical conditions, that define what data is accessible to a specified user. In the example, security assignments 504 show a user name of security assignments 504 as "FIN_USER1," consistent with criteria 502, and various roles assigned to the specified user. The security assignment fields are specified as "Division," and the security assignment values are specified in the "Security Context Value" columns. As shown, FIN_USER1 has permission to access data for the following divisions but not other divisions: Vision Operations, Vision El Salvador, InFusion Portugal BU QA01, InFusion France BU, Vision Poland BU2, Vision Ecuador, PT_351_Infusion Portugal, and InFusion Portugal BU01. The permissions come from various roles of FIN_USER1, which are shown as Expense Auditor, Financial Application Admin, Line Manager, Supplier Admin, Procurement Manager, Accounts Payable Manager, Accounts Receivable Manager, and Financial Application Admin.

Using Security Assignments to Restrict Data
Beyond Role-Based Access Controls

FIG. 1 illustrates a flow chart showing an example process 100 for enforcing multi-dimensional data security using security assignments beyond role-based access controls. Process 100 begins in block 102, where a request is submitted on behalf of a user for access to database structure(s). In block 104, predicate(s) are requested from an authorization service. The authorization service determines the predicate(s) based on the role(s) assigned to the user and the database structure(s) from which data is requested. The role(s) may be assigned to user(s) in a role assignment database structure that may be persistently stored in the database and/or persisted outside the database based on user sessions that are using or have used an application service. Each role referenced in the role assignment database structure may specify type(s) of access that are allowed for the corresponding role against which database structure(s). The predicate(s) may be persistently mapped, in predicate database structure(s) that may be stored in association with objects corresponding to the database structure(s) for which access has been requested. The predicate database structure(s) may be stored as metadata for the objects or separately from the objects and may be maintained within or outside the database by an application. The predicate(s) indicate which type(s) of access against which database structure(s) are used corresponding to the role(s) of the user to carry out the request, and the database structure(s) indicated in the predicates may then be used to further fill in security assignments in block 106. In block 106, the predicate(s) are used to retrieve a security assignment that restricts access to the database structure(s) beyond the role(s) assigned to the user. For example, the specified database structure(s) in the predicate(s) may belong to one or more object group(s), and security assignment(s) for any object group(s) including the specified database structures may be retrieved as applicable to carry out the request against the database. In block 108, the predicate is used by the database to restrict data accessible from the database structure(s) to generate a result set. The result set is transmitted to the user in block 110.

The security assignment may apply to the user or a group of users to which the user belongs and may apply to one or more database structures involved in the data access request. The security assignment assigns, to security assignment field(s), security assignment value(s) corresponding to record(s) of the database structure(s) accessible to the user. The security assignment restricts access to database structure(s) by preventing access to other records that do not have the security assignment value(s) for the security assignment field(s). In one embodiment, a user has access to a record if the record matches any security assignment value for any security assignment field. The database structure(s) for which access is restricted may otherwise be accessible to the user under the user's role(s).

The database may receive a query requesting the security assignment(s), and the query may be the same data access query that is used to retrieve the data from the database to generate a result set for the request. In other words, the data access as received by the database may be missing the security assignment field(s) and value(s) but may reference the security assignment database structure. As part of executing the query, the security assignment field(s) and value(s) may be filled into the query and passed to the database execution engine. For example, the security assignment(s) may be used to insert or substitute conditions into predicate(s) of the data access query, such as in a where clause of the query. In this manner, the predicate(s) sent to the database may be dynamically filled in by the database with the security assignment field(s) and value(s) as part of or otherwise pursuant to executing the query to retrieve the data. The database may then use the approved access paths that were included in the predicates and the additional conditions from the security assignments to retrieve the accessible records from the corresponding database structures. For example, the query may select data from the one or more database structures where the one or more security assignment fields match the one or more security assignment values. By selecting only that data which matches the condition(s), the condition(s) in the query may serve to exclude records that do not match the conditions (i.e., where the security assignment field(s) do not match the security assignment value(s)).

FIG. 2 illustrates a diagram showing an example system 200 for enforcing multi-dimensional data security using security assignments beyond role-based access controls. As shown, user request 202 is received for a user John_Smith. Identity cloud 204 authenticates the user of user request 202 as John_Smith who has an ABC_PAYABLES database role. Identity cloud 204 returns a token to be used in carrying out user request 202 and authenticating with application platform 206 and/or database 202. User request 202 prompts application platform 206 for data processing, such as process of data associated with a particular object such as Invoice. Object access service 208 for the particular object requests from authorization service 210 any predicates relevant to read request policies for the user on the Invoice object. Authorization service 210 discovers that the ABC_PAYABLES role provides read permissions on the Invoice object and verifies that John_Smith is assigned to the ABC_PAYABLES role. Authorization service 210 returns a predicate to object access service 208 for use in retrieving security assignments. Database 202 uses security assignment database structure 216 to retrieve relevant security context for an object group ABC_PAYABLES that has the same name as or is otherwise mapped to the role and includes, within the object group, the Invoice object. As shown, the object group 218 is updated whenever a new role 214 is created or modified.

In a standard Path A, database 202 does not need to return the partial result to object access service 208, costing an extra round trip. Instead, database 202 inserts conditions from the security context 900 retrieved from security assignment database structure 216 into a revised query for execution against underlying database structures storing data being accessed 220. A result set for Path A is returned to object access service 208, and the result set may be used to cause display of results of the data processing in response to the user request 202, such as on a consumer system via a consumer interface such as a user interface. In another embodiment, rather than using the result set to cause display of results to the user on a user interface, the result set may be provided to a consumer system that integrates the result set with other data stored by the consumer system such that the data may be consumed via a consumer interface. For example, the consumer interface may enable triggers to be activated based on the result set, dashboards or reports to be updated based on the result set, automated notifications based on the result set, or other actions to be taken based on the result set as the result set is integrated with other multidimensional data in integrated storage and conditions are evaluated in the integrated storage. In one embodiment, the consumer interface is an application programming interface or a representational state transfer (REST) interface that provides data to an application component for triggering one or more downstream actions.

In an optional Path B, database 202 returns a security context retrieved from security assignment database structure 216 to object access service 208, which then uses the returned security context to submit a revised query to database 202. Database 202 executes the revised query against underlying database structures storing data being accessed 220. A result set for Path B is returned to object access service 208, and the result set may be used to cause display of results of the data processing in response to the user request 202, such as on a consumer system via a consumer interface such as a user interface. In another embodiment, rather than using the result set to cause display of results to the user on a user interface, the result set may be provided to a consumer system that integrates the result set with other data stored by the consumer system such that the data may be consumed via a consumer interface. For example, the consumer interface may enable triggers to be activated based on the result set, dashboards or reports to be updated based on the result set, automated notifications based on the result set, or other actions to be taken based on the result set as the result set is integrated with other multidimensional data in integrated storage and conditions are evaluated in the integrated storage. In one embodiment, the consumer interface is an application programming interface or a representational state transfer (REST) interface that provides data to an application component for triggering one or more downstream actions.

In the embodiments relying on security assignments, the request may be executed on behalf of the user in a stateless manner such that the query to the database is submitted by a base user with more privileges than a user who initially submitted the request. Although the base user may normally have access to more data than the user who submitted the request, the additional predicates of the data access query ensure that the result set includes only those results which the initial user is allowed to access. The same base user may submit requests in this manner on behalf of different users at different times in the same database session or in different database sessions. For example, different requests may be submitted by a first user and a second user, and the different requests may access same or different database structures. The users may have same or different roles used to access the same or different database structures, and same or different predicates may be retrieved and attached to a data access query submitted to the database. Same or different security assignments may be retrieved based on the predicates, and same or different result sets may be produced based on executing the queries with access limited by the retrieved security assignments. The result sets may be passed to client devices operated by the different users.

In various embodiments, the application and database may be capable of executing requests in a stateful or stateless manner. Stateless requests may be executed using the security assignments as selected based on the role of the user. Stateful requests may be executed using the role of the user with or without security assignments applied. Security assignments may be applied in a stateful manner by executing the request in a database session specific to the requesting user rather than generically for a base user. The result set retrieved from the request may then be further filtered by the application based on the stored security assignments before returning a reduced or filtered result set to the user.

In another embodiment, a stateful request may be executed in a database session specific to the requesting user, and the stateful request may involve two parts: (1) a part requesting security assignments that apply to the user, and (2) a part retrieving requested data with predicates applied to the query according to the retrieved security contexts that apply to the user.

In yet another embodiment, stateful requests may also include a single round trip request to the database, retrieving the security assignments and inserting conditions based on the security assignments into predicate(s) of the data access query. The single round trip may be performed in a database session specific to the user, and the result set with the predicates already applied was selected to include only that information which complies with the security assignments for the user.

In various other embodiments, one, two, or more stateless requests and one, two, or more stateful requests are processed by the same application and same database on same or different dimensions of data (referencing same or different database structures), using the same security assignments. The application developer may elect which execution routes (stateless or stateful) to take depending on the scenario.

In one embodiment, a database implements data security using a grant. A grant ties what data is allowed for a user with a role against a function. An application-managed object may be designed to work with a function out of the factory. For example, Invoice is coded to work with Manage Invoice function. When an object is accessed, the application causes retrieval of the grants available for the user based on role information in the database for the user's session, and the application may build a list of filter conditions that are applied to the final query to limit the result set.

Some applications pass the stateful information about roles from the identity management system to the database and persist the user role membership in the database so grants may be applied at runtime. For example, when the user logs into the system, the security authorization system may create a copy of the data of the functional roles available to the user and stores a copy of the functional roles as part of a database session for the user. Some applications, such as Oracle® Application Development Framework's REST API process requests in a stateless manner across requests but still manage state about roles during a request. The application passes over the role information to the database to apply data grants specific to the request.

In a REST API context, each request is a one-off request that may not be attached to specific user security state. The information of the role is normally available in the state, which is not available in the REST API context. When a policy is created and a user is given a role, a user with the role is given access to read and/or write to one or more objects. A role is the group of objects to which access has been granted. Additional security assignments may be retrieved for the group of objects to which the role(s) apply, and the additional security assignments may be used to append conditions to a data access query against the database.

Microservices and REST services may be executed without re-authenticating a user with the database to load the stateful role information into the database. An application-side authorization service may check the security assignments to determine whether a user has access to the object and, if so, what data to pull on behalf of the user for the object.

The system designed for stateless microservices works with existing stateful systems and may be backward compatible with the mechanism of securing data access via grants and security assignments.

The stateless embodiments described herein work with microservices, which are used to make requests tied with specific functionality on behalf of many users. With the advent of microservices, there is often no single system that processes requests for every type of functionality. Instead, each different type of request is handled by a separate system, and each separate system manages information in coordination with the database.

In various embodiments described herein, some database structures may be managed using both roles and security assignments that restrict access to the database structures beyond the roles, and other database structures may be managed by roles alone without checking for security assignments. If no security assignments are required for the database structure, rows of the database structure are accessible without a security assignment granting access to the rows of the database structure. If security assignments are required for the database structure, rows of the database structure are not accessible without a security assignment granting access to the rows of the database structure. The security assignments for those database structures managed by security assignments may be retrieved using predicates stored in a predicate database structure.

In one embodiment, an independent service handles policies about what application-managed objects and their data are accessible to a given subject. The role-based access control enforced through the identity management system and the database control identity and roles for a subject without awareness of the application-managed object and any constraints on accessible data beyond the roles that are driven by database structure access paths.

Application-managed object policies may be managed using a separate authorization service. The microservices architecture along with stateless and self-contained services rely on the authorization service to select the correct data without having the role information in the database to apply data security grants. The authorization service uses policies that define what actions on application-managed objects are allowed (Permission Group), who can do the action (User or Role), and for which data, via a Security View that can control fields and rows. At runtime an end user gets applicable policies based on the role assignments in the authorization service, and these applicable policies are used to execute the data access query.

In one embodiment, if the application captures security assignments in a different table other than the role-based access database structures, an application-managed object may link the role to the security assignment as a grant. The grant connects the database copy of the role with the database copy of the security assignment and specifies what conditions should be applicable to the application-managed object. The application-managed object itself may have metadata or other configuration information to indicate which grants are to be retrieved. The application-managed object is configured to look for security assignments for a user associated with a role grant that is being used to access the application-managed object. The application-managed object causes the application to look into the security assignment database structure to retrieve conditions for controlling which rows to return from the data object.

The application-managed object may include metadata, for example, as hierarchically marked up data in an object definition, that names the grant to use for data access to the application-managed object. For example, the application-managed object may have a "ViewCriteria" tag that identifies the grant to use for accessing the application-managed object. An example ViewCriteria tag as metadata for the application-managed object is shown below:

```
". . .
<ViewCriteria
    Name="MANAGE_INVOICE_DATA___ALL_DIVISIONS"
    ViewObjectName="system.apps.invoices.transactions.restModel.view.InvoiceHead
erV0"
    Conjunction="AND">
. . ."
```

The ViewCriteria tag of an application-managed object such as the tag above may instruct the application accessing the Invoices object to view the grant (e.g. MANAGE_IN-VOICE_DATA), which may result in viewing all security assignments that would be evaluated by the (MANAGE_INVOICE_DATA) grant against different roles.

assignments for the user, pulls those security assignments back and determines whether any of the security assignments give access to the requested object and what rows of the object the user gets access to.

The roles for a given user from a given session in which the user is logged in or has logged in can be retrieved from the database in association with the given session. The database tracks the roles of users generally and in particular, roles available to users of database sessions. The roles attached to the user may be pushed down to the database as part of an active session when the user logs in to create a session with the database. The security system captures all of the roles the user has and pushes these roles into a database structure that tracks a user's roles for the session.

Grant(s) are referenced by the application-managed object, and the grant(s) specify predicate(s) that includes filter criteria for looking up security assignments in the security assignment database structure. The security assignment(s) are retrieved and used to execute the query with conditions added to the query from the security assignment field(s) and value(s) retrieved based on the predicate(s).

| Row | Date | Grant Name | Object Name | GRANTEE TYPE | ROLE NAME |
|---|---|---|---|---|---|
| 1 | Jan. 23, 2024 | MANAGE_INVOICE_DATA | ALL_DIVISIONS | GROUP | SUPERVISOR_JOB |
| 2 | Feb 3, 2024 | MANAGE_INVOICE_DATA | ALL_DIVISIONS | USER | SPECIALIST_JOB |
| 3 | Feb. 4, 2024 | MANAGE_INVOICE_DATA | ALL_DIVISIONS | GROUP | MANAGER_JOB |
| 4 | Mar. 5, 2024 | MANAGE_INVOICE_DATA | ALL_DIVISIONS | USER | AUDITOR_JOB |
| 5 | Apr. 15, 2024 | MANAGE_INVOICE_DATA | ALL_DIVISIONS | USER | AGENT_JOB |
| 6 | Apr. 17, 2024 | MANAGE_INVOICE_DATA | ALL_DIVISIONS | USER | STAFF_JOB |
| 7 | Apr. 25, 2024 | MANAGE_INVOICE_DATA | ALL_DIVISIONS | USER | STAFF_JOB |

The grant tells how to get the different assignments using a predicate, such as the example predicate shown below:

The grant may apply to different roles in different ways. For each role, the grant includes information about the data

```
INVOICES.DIV_ID_IN (SELECT ORG_ID FROM
FUN_USER_ROLE_DATA_ASSIGNMENTS WHERE USER_GUID =
FIND_GLOBAL.USER_GUID AND ROLE_NAME = &GRANT_ALIAS.ROLE_NAME
AND ACTIVE_FLAG!= 'N')
```

The security assignments are retrieved according to a predicate such as the example above. In the example, DIV_ID is the division in which the user is located. Other attributes about the user may also be passed in via the predicate, such as a region, a work address, or other information. If the user has the grant and the target role (as specified by FUN_USER_ROLE_DATA_ASSIGNMENTS in the example), then the database queries the security context for the corresponding user (USER_GUID=FIND_GLOBAL.USER_GUID in the example) and the corresponding role (ROLE_NAME=&GRANT_ALIAS.ROLE_NAME in the example) where the security assignment is still active or not marked as inactive (ACTIVE_FLAG!='N').

In retrieving the security assignments, the database looks for the specific user and role combination to find the security access predicate for each of the different roles that specifies what data can be accessed by the role according to that grant. The predicate includes a condition to check the security assignment database structure based on the corresponding user and the corresponding role to retrieve filter criteria that determine which rows can be accessed within the filter criteria of the security assignments fetched by the predicate.

In one example shown in Table 1, there is an application-managed object and a couple of roles that define what is allowed on the application-managed object. At this point the security is functional (who and what) without distinguishing which subsets of data are accessible.

TABLE 1

| Role | Object | Create | Read | Update | Delete |
|---|---|---|---|---|---|
| Payables Invoice Supervisor | Payables Invoice | Y | Y | Y | Y |
| Payables Invoice Supervisor | Payables Payment | | Y | | |
| Payables Payment Supervisor | Payables Invoice | | Y | | |
| Payables Payment Supervisor | Payables Payment | Y | Y | Y | Y |

Data access assignments have been provided to the user via a stateful interface, as shown in Table 2.

TABLE 2

| User | Role | Security Context Field | Security Context Value |
|---|---|---|---|
| India Supervisor | Payables Invoice Supervisor | Division | India |
| America Supervisor | Payables Invoice Supervisor | Division | America |

As shown, the application-managed object carries meta-data (e.g., from factory or added later) to show data based on security assignments for a given user and role. From the configurations above, India Supervisor with Payables Supervisor role can manage Payables Invoice for India Division. The role information may be obtained from the security layer sending the user's role information to the database in a stateful system.

In a stateless microservice system, this information is not available in the database. During runtime, the filter condition cannot resolve as-is based on role via security assignments, as roles are not available.

In order to process the query in a stateless system, the application may keep track of the object applicable to a role, or the objects for which access is impacted by a role. A role is a mechanism to capture what actions are allowed on an application-managed object or a group of application-managed objects, and the role may be interchangeable for security assignment purposes with the group of objects to which the role provides access.

The actions allowed on those objects can be homogeneous or heterogeneous. For example Payables Invoice Supervisor is managing two objects: Payables Invoice with all actions, and Payables Payment with only read action. As long as the group of objects with their allowed actions for a user are known, the system does not need to depend on the role and eliminates the need to manage state on the role. The system may represent the roles as a group of objects, moving away from the role and considering each policy as a mechanism to manage a group of objects. The system stores the group of objects allowed for the target and hence allows the system to move away from role and stateful data needed for each user-role combination.

The application may allow a user to express data security assignments in terms of a group of objects (e.g., identified using a role name representing a group of objects or another named mapped to the group of objects) instead of role itself. For backward compatibility, initially the group may be mapped to the role in a mapping table or, in the absence of an explicit mapping, share the same name as the role.

In one embodiment, the application builds object groups corresponding to roles. When end users are assigned policies via a security console interface, the system responds to the event and consumes the policy information from the authorization service and reads the definition to determine what objects and actions are allowed for the target user. This information is then used to create an object group in an application-managed database, which is used to determine what data is accessible. The object group information is not stateful and resides in the data as long as the role is not modified.

Object groups can be assigned based on the role assignments because each role grant has underlying objects involved and access types granted for the objects. The role can then be translated to a group of objects where each object is granted the access types that were granted by the role. A new object group may be mapped to the role name in the security assignments, to track access for objects in the group, so that changes to the roles can trigger changes to any security assignments associated with the object group.

When a role is created or modified, the application may pull the role information into the object group. The application may use the object group information and security assignments to determine object access constraints even without re-consulting roles from that point forward, and the application is said to not be state dependent because the role information of the requesting user does not need to be loaded to the database session in order to select the right security assignments belonging to the right object groups for the user.

Roles may be specified in a modular manner specific to duties, jobs, tasks, and responsibilities. For example, an invoice processing duty role may include access to an invoice page and other pages to update the invoice object, and the security assignments for the role for the invoice object may specify what filter criteria to apply for accessing data rows from those pages via the invoice processing duty role for specific users. Security assignments associated with a broader job role may be pulled to guide access for a user carrying out a function of the job role, which could include many duty roles.

In a specific example, duty roles and job roles are assigned to users. Duty roles cannot be directly assigned to a user. Duty roles roll up to a job role, and a job role is assigned to a user. Duty roles get packed into a job role and assigned to the user. The duty roles and job roles may each be managed as a group of objects, and the groups of objects may be determined in a computationally efficient manner as described herein.

The object groups representing roles may be determined synchronously as roles are modified and/or asynchronously via a periodic, scheduled, or out-of-band process that updates object groups in the system. The process may start by identifying all the role policies that got recently created or updated so they may be updated, for example, using a command such as GET~/v1/policies. The policies may be sorted by the authorization service or sorted afterwards, for example, by date updated or date created, to allow more stale policies to be updated first.

In one embodiment, the application finds all policies against duty roles. For each policy, the application reads the permission assignments and builds the object group for the duty role. If the object uses a Security View (SV) based on security assignments, then the security view may be included into the object group. Security views may be mapped the role name to allow the security assignments to be identified based on the role name. Object groups need not be created when the Security View does not make use of security assignments. If the naming convention is used for the Security View, such naming convention may also indicate that a security assignment is present or could be present for the corresponding object(s).

The object group to duty role mapping may be stored in a cache based on for which objects permissions are required for the role. If the duty role inherits other duty roles, recursive inclusion is not needed until the roles have been fully traversed. Objects may be included recursively at the end when the descendant roles are computed.

Then, the application may find any policies against job roles. For each policy, the application determines if a direct object permission is assigned. For such polices, the object group is built for the job role. There may or may not be direct object permission assignments to job roles, as the job role inherits the duty roles' object permission assignments.

Next, the application stores the object group to job role mapping in a cache used for direct assignments. For each of the job roles identified, an authorization service API is invoked to get all descendants of the role. The authorization service automatically recurses to compute all descendants of a role that include other job roles and duty roles. For each descendant, the application uses the pre-computed duty role and job role object assignment cache, accumulates all object assignments, and builds the final object groups. In this second iteration of building object assignments, each policy target that is a job role is processed with descendant objects from the duty policies rolling up to the job role. For example, such descendants may be obtained in the authorization service using the command, GET~/v1/roles/{name}/descendants. The final object groups are synchronized and verified with what exists in the database.

Using the authorization service, end users may create and maintain security assignments, using a security assignment management user interface. The security assignment records drive data access across the application and authorization platform. Behind the scene, the application looks up the policies against each authorization service role and determines the list of application-managed objects the role interacts with. The security view of each security assignment-enabled object looks up the security assignments for the corresponding object for the current user.

There are many types of application-managed objects for which security assignments may be maintained. A "classic object" is an object with single-dimension based data security managed in a stateful manner. A "complex object" is an object with multi-dimensional based data security managed in a stateless manner.

As described herein, there is common application and database infrastructure used for stateless application in unison with stateful application based on an assignment model to grant access across single/multiple dimensions using security assignments.

In one embodiment, the system is configurable where new/additional security assignments (such as division, organization, region, etc.) can be added or modified directly to guide data access in a stateless or stateful manner.

Figure 4:
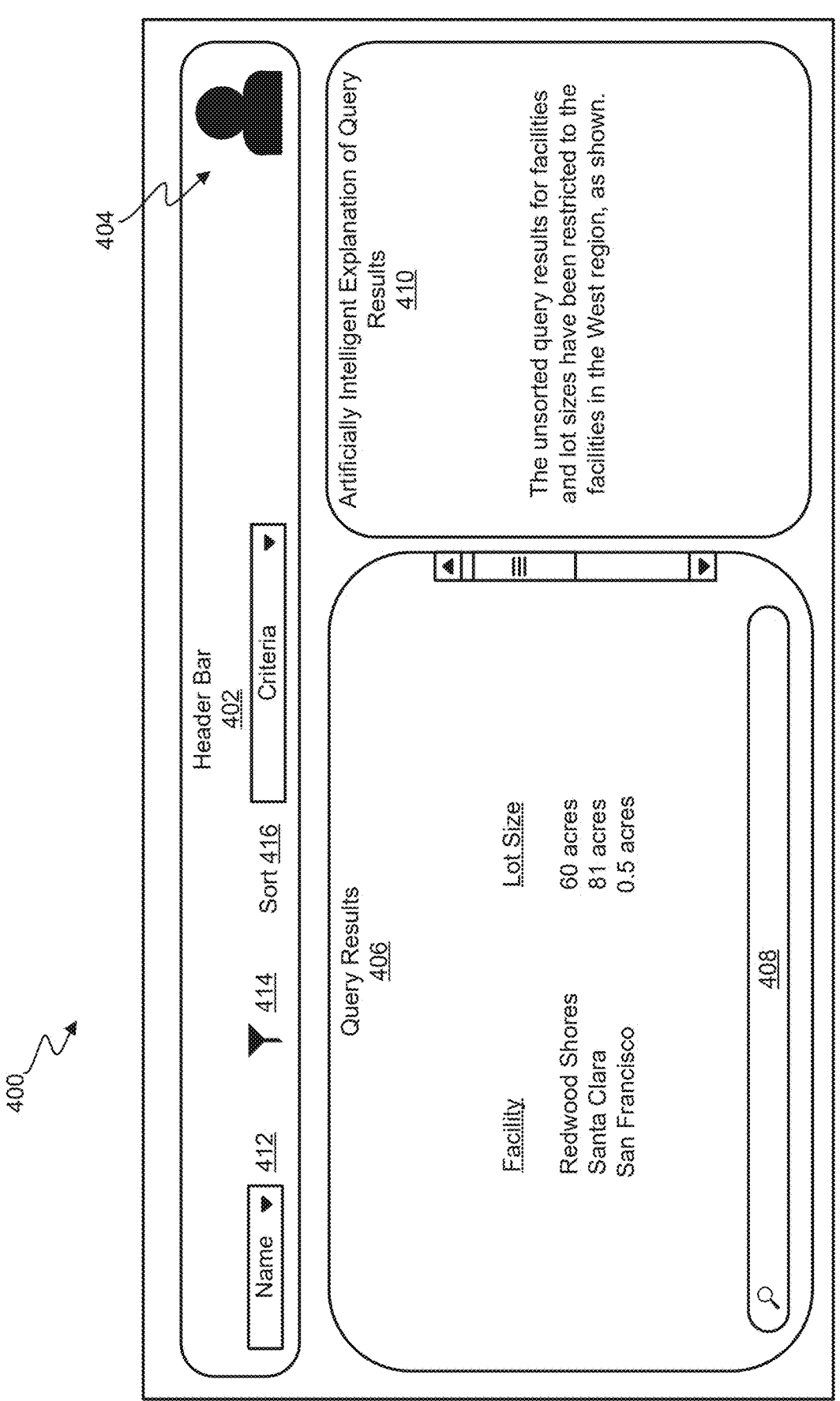
FIG. 4 illustrates a diagram of an example user interface for viewing a result set where data security is enforced using security assignments beyond role-based access controls.

FIG. 4 illustrates a diagram of an example user interface 400 for viewing a result set as part of query results 406 where data security is enforced using security assignments beyond role-based access controls. A query may be submitted based on a variety of application interactions, such as a search bar 408, drop-down menu 412, filter option(s) 414, sort criteria 416, other menus, dashboards, charts, tables, graphs, or other application-specific components that rely on data to display data-specific graphical elements. User interface 400 may also include a header bar 402, which may show information about a user 404 logged into a session with the application. In the example of FIG. 4, user interface

400 also includes an artificially intelligent explanation of query results 410. Such explanation may be produced based on heuristics, supervised machine learning trained on similar results, and/or prompting of a large language model with query results 406 or a portion thereof asking the large language model to summarize query results 406. In this example, results from the large language model may be displayed concurrently with query results 406, as shown.

Computer System Architecture

Figure 6:
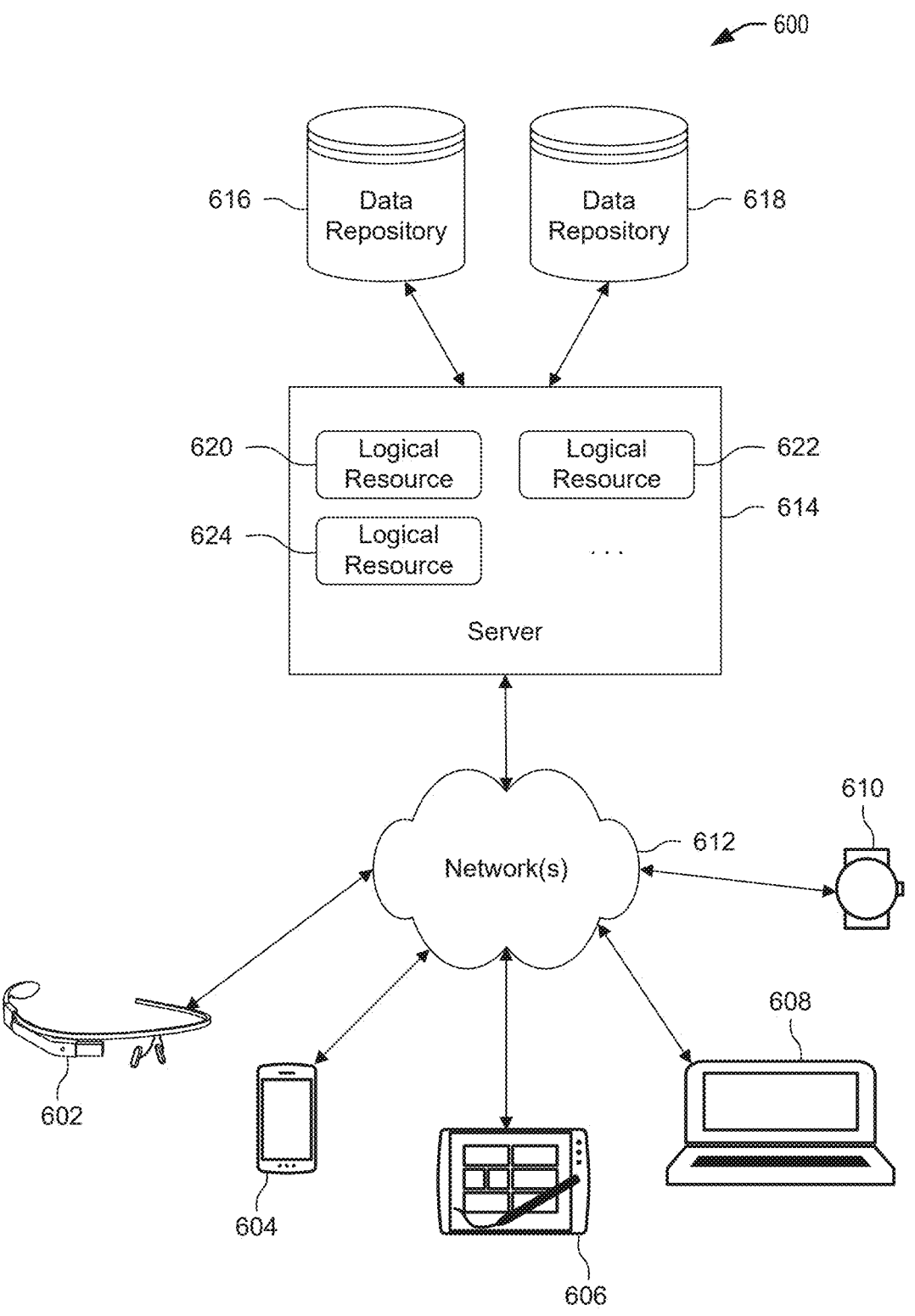
FIG. 6 depicts a simplified diagram of a distributed system for implementing certain aspects.

FIG. 6 depicts a simplified diagram of a distributed system 600 for implementing an embodiment. In the illustrated embodiment, distributed system 600 includes one or more client computing devices 602, 604, 606, 608, and/or 610 coupled to a server 614 via one or more communication networks 612. Clients computing devices 602, 604, 606, 608, and/or 610 may be configured to execute one or more applications.

In various aspects, server 614 may be adapted to run one or more services or software applications that enable techniques for configuring and enforcing multi-dimensional data security using security assignments beyond role-based access controls.

In certain aspects, server 614 may also provide other services or software applications that can include non-virtual and virtual environments. In some aspects, these services may be offered as web-based or cloud services, such as under a Software as a Service (SaaS) model to the users of client computing devices 602, 604, 606, 608, and/or 610. Users operating client computing devices 602, 604, 606, 608, and/or 610 may in turn utilize one or more client applications to interact with server 614 to utilize the services provided by these components.

In the configuration depicted in FIG. 6, server 614 may include one or more components 620, 622 and 624 that implement the functions performed by server 614. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, 608, and/or 610 for techniques for configuring and enforcing multi-dimensional data security using security assignments beyond role-based access controls in accordance with the teachings of this disclosure. A client device may provide an interface that enables a user of the client device to interact with the client device. The client device may also output information to the user via this interface. Although FIG. 6 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome®

OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 612 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 612 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 614 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 614 can include one or more virtual machines running virtual operating systems, or other computing architectures involving virtualization such as one or more flexible pools of logical storage devices that can be virtualized to maintain virtual storage devices for the server. In various aspects, server 614 may be adapted to run one or more services or software applications that provide the functionality described in the foregoing disclosure.

The computing systems in server 614 may run one or more operating systems including any of those discussed above, as well as any commercially available server operating system. Server 614 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 614 may include one or more applications to analyze and consolidate data feeds and/or event updates received from users of client computing devices 602, 604, 606, 608, and/or 610. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 614 may also include one or more applications to display the data feeds and/or real-time events via one or more display devices of client computing devices 602, 604, 606, 608, and/or 610.

Distributed system 600 may also include one or more data repositories 616, 618. These data repositories may be used to store data and other information in certain aspects. For example, one or more of the data repositories 616, 618 may be used to store information for techniques for configuring and enforcing multi-dimensional data security using security assignments beyond role-based access controls. Data repositories 616, 618 may reside in a variety of locations. For example, a data repository used by server 614 may be local to server 614 or may be remote from server 614 and in communication with server 614 via a network-based or dedicated connection. Data repositories 616, 618 may be of different types. In certain aspects, a data repository used by server 614 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 616, 618 may also be used by applications to store application data. The data repositories used by applications may be of different types such as, for example, a key-value store repository, an object store repository, or a general storage repository supported by a file system.

In one embodiment, server 614 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 7:
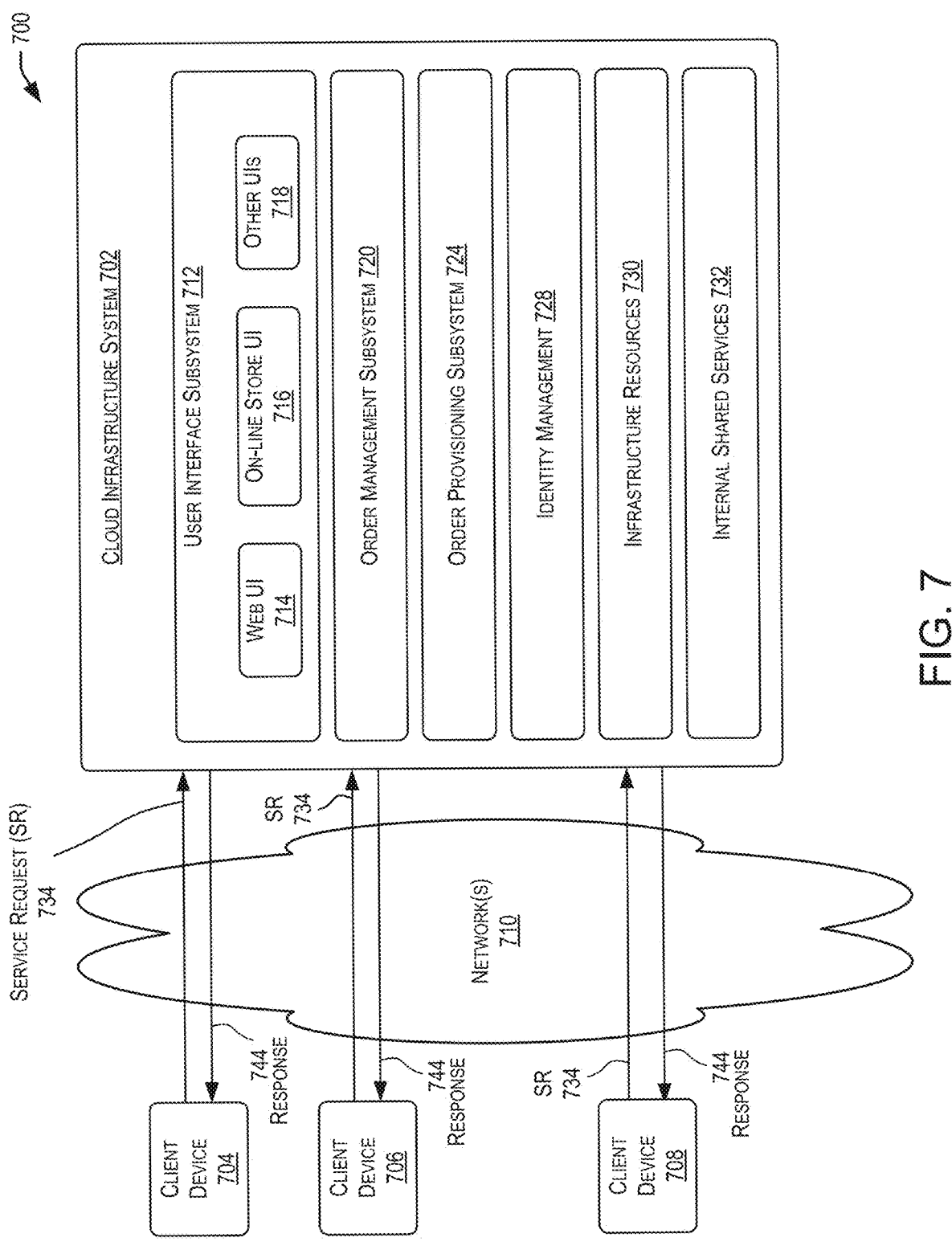
FIG. 7 is a simplified block diagram of one or more components of a system environment by which services provided by one or more components of an embodiment system may be offered as cloud services, in accordance with certain aspects.

FIG. 7 is a simplified block diagram of a cloud-based system environment in which multi-dimensional data security is configured and enforced using security assignments beyond role-based access controls, in accordance with certain aspects. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other aspects, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative aspects.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 710 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 702 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 702 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 702. Examples of SaaS services provided by Oracle Corporation® include, without limitation, various services for human resources/ capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 702. Cloud infrastructure system 702 then performs processing to provide the services requested in the tenant's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public tenant, where the tenant can be an individual or an enterprise. In certain other aspects, under a private cloud model, cloud infrastructure system 702 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702.

In some aspects, the processing performed by cloud infrastructure system 702 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining the intent of an utterance. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain aspects, to facilitate efficient provisioning of these resources for supporting the various cloud services provided by cloud infrastructure system 702 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a tenant may, using a client device, request (service request 734) one or more services provided by cloud infrastructure system 702 using one or more of interfaces 714, 716, and 718. For example, a tenant may access the online store, browse cloud services offered by cloud infrastructure system 702, and place a subscription order for one or more services offered by cloud infrastructure system 702 that the tenant wishes to subscribe to. The service request may include information identifying the tenant and one or more services that the tenant desires to subscribe to.

In certain aspects, such as the embodiment depicted in FIG. 7, cloud infrastructure system 702 may comprise an order management subsystem (OMS) 720 that is configured to process the new order. As part of this processing, OMS 720 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 702 may send a response or notification 744 to the requesting tenant to indicate when the requested service is now ready for use. In some instances, information (e.g., a link) may be sent to the tenant that enables the tenant to start using and availing the benefits of the requested services.

Cloud infrastructure system 702 may provide services to multiple tenants. For each tenant, cloud infrastructure system 702 is responsible for managing information related to one or more subscription orders received from the tenant, maintaining tenant data related to the orders, and providing the requested services to the tenant or clients of the tenant. Cloud infrastructure system 702 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 702 may provide services to multiple tenants in parallel. Cloud infrastructure system 702 may store information for these tenants, including possibly proprietary information. In certain aspects, cloud infrastructure system 702 comprises an identity management subsystem (IMS) 728 that is configured to manage tenant's information and provide the separation of the managed information such that information related to one tenant is not accessible by another tenant. IMS 728 may be configured to provide various security-related services such as identity services, such as information access management, authentication and authorization services, services for managing tenant identities and roles and related capabilities, and the like.

Figure 8:
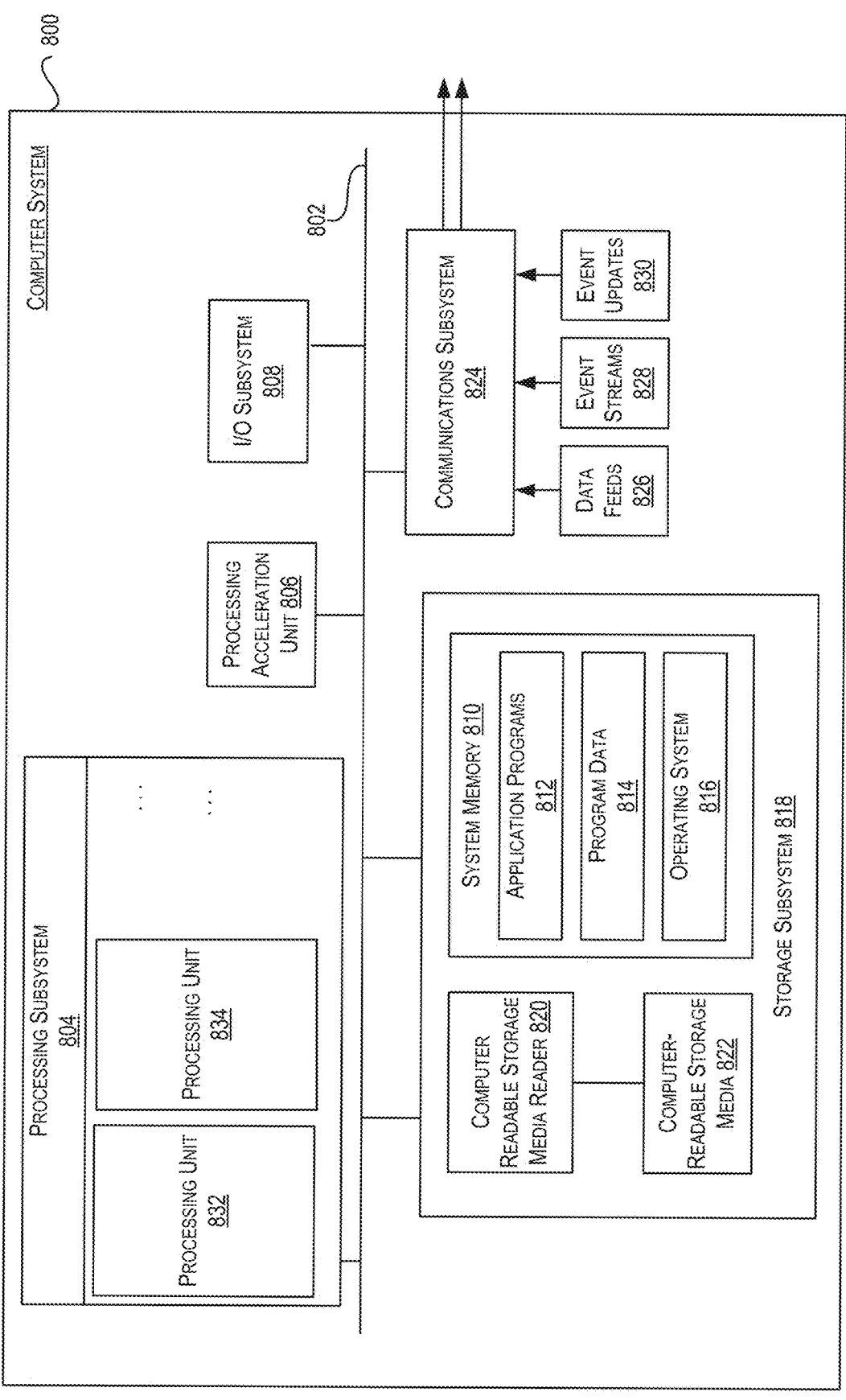
FIG. 8 illustrates an example computer system that may be used to implement certain aspects.

FIG. 8 illustrates an exemplary computer system 800 that may be used to implement certain aspects. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some aspects, processing subsystem 804 can include one or more special purpose co-processors such as graphics processors, digital signal processors (DSPs), or the like. In some aspects, some or all of the processing units of processing subsystem 804 can be implemented using customized circuits, such as application specific integrated circuits (ASICs), or field programmable gate arrays (FPGAs).

In some aspects, the processing units in processing subsystem 804 can execute instructions stored in system memory 810 or on computer readable storage media 822. In various aspects, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain aspects, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some aspects. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 822 may store programming and data constructs that provide the functionality of some aspects. Computer-readable media 822 may provide storage of computer-readable instructions, database structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, digital video disc (DVD), a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 818 may also include a computer-readable storage media reader 820 that can further be connected to computer-readable storage media 822. Reader 820 may receive and be configured to read data from a memory device such as a disk, a flash drive, etc.

In certain aspects, computer system 800 may support virtualization technologies, including but not limited to virtualization of processing and memory resources. For example, computer system 800 may provide support for executing one or more virtual machines. In certain aspects, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain aspects, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 824 can provide wired network connectivity (e.g., Ethernet) in addition to or instead of a wireless interface.

Communication subsystem 824 can receive and transmit data in various forms. For example, in some aspects, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing a user request on behalf of a user for one or more types of access to one or more database structures of a database;

requesting, from an authorization service, one or more predicates that are persistently mapped, in one or more predicate database structures, to one or more roles persistently assigned, in a role assignment database structure, to the user and stored in association with at least one type of access of the one or more types of access and at least one database structure of the one or more database structures; wherein the one or more predicates indicate the at least one type of access and the at least one database structure for which the one or more roles of the user provide at least one of the one or more types of access;

using the one or more predicates from the authorization service to retrieve, from a security assignment database structure, a security assignment for the user relative to the at least one database structure of the one or more database structures of the database, wherein the security assignment assigns, to one or more security assignment fields, one or more security assignment values corresponding to one or more records of the at least one database structure accessible to the user, wherein the security assignment restricts access to the at least one database structure at least in part by preventing access one or more other records that do not have the one or more security assignment values for the one or more security assignment fields, wherein the one or more other records are otherwise accessible under the one or more roles;

using the at least one type of access for the at least one database structure further restricted by the security assignment, retrieving, in a database session for a base user with more access than the user, a result set from the one or more database structures at least in part by specifying one or more conditions in a query that selects data from the one or more database structures where the one or more security assignment fields match the one or more security assignment values, wherein the one or more conditions in the query exclude data from the one or more database structures where the one or more security assignment fields do not match the one or more security assignment values; and transmitting at least part of the result set to a consumer system for consumption via a consumer interface.

2. The computer-implemented method of claim 1, wherein the one or more predicates are dynamically filled in by the database in the database session for the base user with the one or more security assignment fields and the one or more security assignment values pursuant to retrieving the security assignment, and wherein the one or more conditions in the query that selects the data from the one or more database structures comprise the one or more security assignment fields and the one or more security assignment values.

3. The computer-implemented method of claim 1, wherein the user is a first user, the user request is a first user request, the one or more types are one or more first types, the one or more predicates are one or more first predicates, the one or more roles are one or more first roles, the security assignment is a first security assignment, the one or more security assignment fields are one or more first security assignment fields, the one or more security assignment values are one or more first security assignment values, the result set is a first result set, the one or more conditions are one or more first conditions, the query is a first query, and the client device is a first client device, the computer-implemented method further comprising:

accessing a second user request on behalf of a second user for one or more second types of access to the one or more database structures of the database;

requesting, from the authorization service, one or more second predicates that are persistently mapped, in one or more predicate database structures, to one or more second roles persistently assigned, in the role assignment database structure, to the second user and stored in association with at least a second type of access of the one or more second types of access and at least one database structure of the one or more database structures; wherein the one or more second predicates indicate at least the second type of access and the at least one database structure for which the one or more second roles of the second user provide at least the second type of access;

using the one or more second predicates from the authorization service to retrieve, from the security assignment database structure, a second security assignment for the second user relative to the at least one database structure of the one or more database structures of the database, wherein the second security assignment assigns, to one or more second security assignment fields, one or more second security assignment values corresponding to one or more records of the at least one database structure accessible to the second user, wherein the second security assignment restricts access to the at least one database structure at least in part by preventing access one or more other records that do not have the one or more second security assignment values for the one or more second security assignment fields, wherein the one or more other records are otherwise accessible under the one or more second roles;

using at least the second type of access for the at least one database structure further restricted by the second security assignment, retrieving, in a database session for a base user with more access than the second user, a second result set from the one or more database structures at least in part by specifying one or more second conditions in a second query that selects data from the one or more database structures where the one or more second security assignment fields match the one or more second security assignment values, wherein the one or more second conditions in the second query exclude data from the one or more database structures where the one or more second security assignment fields do not match the one or more second security assignment values; and transmitting at least part of the second result set to a second client consumer system for consumption via a second consumer interface.

4. The computer-implemented method of claim 3, the computer-implemented method further comprising:

accessing a third user request on behalf of a third user for one or more third types of access to the one or more database structures;

retrieving a third result set from the one or more database structures for the third user in a third query that selects data from the one or more database structures without specifying any security assignments that restrict the third result set beyond one or more third roles of the third user, wherein the database excludes data from the third result set based at least in part on the one or more third roles of the third user;

transmitting at least part of the third result set to a third client consumer system for consumption via a third consumer interface.

5. The computer-implemented method of claim 1, wherein the user is a first user, the user request is a first user request, the one or more types are one or more first types, the one or more predicates are one or more first predicates, the one or more roles are one or more first roles, the security assignment is a first security assignment, the one or more security assignment fields are one or more first security assignment fields, the one or more security assignment values are one or more first security assignment values, the result set is a first result set, the one or more conditions are one or more first conditions, the query is a first query, and the client device is a first client device, the computer-implemented method further comprising:

accessing a second user request on behalf of a second user for one or more second types of access to the one or more database structures;

retrieving a second result set from the one or more database structures for the second user in a second query that selects data from the one or more database structures without specifying any security assignments that restrict the second result set beyond one or more second roles of the second user, wherein the database excludes data from the second result set based at least in part on the one or more second roles of the second user;

transmitting at least part of the second result set to a second client consumer system for consumption via a second consumer interface.

6. The computer-implemented method of claim 1, wherein the one or more types of access include create, read, update, or delete access; wherein the security assignment database structure is modifiable by a first set of users; and wherein at least some users of the first set of users are not permitted to modify roles persistently assigned in the database, the computer-implemented method further comprising receiving, by the authorization service, a notification of a change in the database to one or more definitions of the one or more roles of the user, and, based at least in part on the notification, updating the security assignment database structure to de-activate a security assignment that is inconsistent with the change.

7. The computer-implemented method of claim 1, wherein the security assignment database structure does not include information about types of access, and wherein the one or more predicate database structures do not include information about security assignments, the computer-implemented method further comprising:

using the security assignment database structure and the one or more predicate database structures to persistently generate an assignment record comprising different entries for different combinations of users, types of access, and database structures, wherein the assignment record is used to execute one or more user requests and retrieve one or more result sets.

8. The computer-implemented method of claim 1, further comprising causing display of a user interface for creating or modifying one or more security assignments for one or more specified users using a specified security assignment value for a specified security assignment field, wherein the user interface does not provide an option to modify types of access that apply to the created or modified one or more security assignments, and wherein the types of access that apply to the created or modified one or more security assignments are determined by roles persistently assigned in the database to the one or more specified users.

9. The computer-implemented method of claim 1, further comprising causing display of a user interface for managing different security assignments, wherein at least some of the different security assignments include different specified users, different specified security assignment fields, different specified security assignment values, and different specified roles; wherein the different security assignments do not specify which database structures are accessible to the different specified roles, and wherein the different security assignments do not specify which types of access are allowable for the one or more database structures that are accessible to the different specified roles; wherein the one or more database structures that are accessible to the different specified roles and the one or more types of access that are allowable for the one or more database structures that are accessible to the different specified roles are determined by roles persistently assigned in the database to the different specified users.

10. The computer-implemented method of claim 1, wherein the one or more database structures comprise the at least one database structure for which access is managed by the one or more roles and the security assignment and at least one other database structure for which access is managed by the one or more roles and not security assignments; wherein rows of the at least one other database structure are accessible without a security assignment granting access to the rows of the at least one other database structure, and wherein rows of the at least one database structure are not accessible without a security assignment granting access to the rows of the at least one database structure; wherein the one or more predicate database structures are stored as metadata for the at least one database structure.

11. A computer-program product comprising one or more non-transitory machine-readable storage media, including stored instructions configured to cause a computing system to perform a set of actions including:

accessing a user request on behalf of a user for one or more types of access to one or more database structures of a database;

requesting, from an authorization service, one or more predicates that are persistently mapped, in one or more predicate database structures, to one or more roles persistently assigned, in a role assignment database structure, to the user and stored in association with at least one type of access of the one or more types of access and at least one database structure of the one or more database structures; wherein the one or more predicates indicate the at least one type of access and the at least one database structure for which the one or more roles of the user provide at least one of the one or more types of access;

using the one or more predicates from the authorization service to retrieve, from a security assignment database structure, a security assignment for the user relative to the at least one database structure of the one or more database structures of the database, wherein the security assignment assigns, to one or more security assignment fields, one or more security assignment values corresponding to one or more records of the at least one database structure accessible to the user, wherein the security assignment restricts access to the at least one database structure at least in part by preventing access one or more other records that do not have the one or more security assignment values for the one or more security assignment fields, wherein the one or more other records are otherwise accessible under the one or more roles;

using the at least one type of access for the at least one database structure further restricted by the security assignment, retrieving, in a database session for a base user with more access than the user, a result set from the one or more database structures at least in part by specifying one or more conditions in a query that selects data from the one or more database structures where the one or more security assignment fields match the one or more security assignment values, wherein the one or more conditions in the query exclude data from the one or more database structures where the one or more security assignment fields do not match the one or more security assignment values; and transmitting at least part of the result set to a client consumer system for consumption via a consumer interface.

12. The computer-program product of claim 11, wherein the one or more predicates are dynamically filled in by the database in the database session for the base user with the one or more security assignment fields and the one or more security assignment values pursuant to retrieving the security assignment, and wherein the one or more conditions in the query that selects the data from the one or more database structures comprise the one or more security assignment fields and the one or more security assignment values.

13. The computer-program product of claim 11, wherein the user is a first user, the user request is a first user request, the one or more types are one or more first types, the one or more predicates are one or more first predicates, the one or more roles are one or more first roles, the security assignment is a first security assignment, the one or more security assignment fields are one or more first security assignment fields, the one or more security assignment values are one or more first security assignment values, the result set is a first result set, the one or more conditions are one or more first conditions, the query is a first query, and the client device is a first client device, wherein the set of actions further includes:

accessing a second user request on behalf of a second user for one or more second types of access to the one or more database structures;

retrieving a second result set from the one or more database structures for the second user in a second query that selects data from the one or more database structures without specifying any security assignments that restrict the second result set beyond one or more second roles of the second user, wherein the database excludes data from the second result set based at least in part on the one or more second roles of the second user;

transmitting at least part of the second result set to a second client consumer system for consumption via a second consumer interface.

14. The computer-program product of claim 11, wherein the set of actions further includes:

causing display of a user interface for creating or modifying one or more security assignments for one or more specified users using a specified security assignment value for a specified security assignment field, wherein the user interface does not provide an option to modify types of access that apply to the created or modified one or more security assignments, and wherein the types of access that apply to the created or modified one or more security assignments are determined by roles persistently assigned in the database to the one or more specified users.

15. The computer-program product of claim 11, wherein the set of actions further includes:

causing display of a user interface for managing different security assignments, wherein at least some of the different security assignments include different specified users, different specified security assignment fields, different specified security assignment values, and different specified roles; wherein the different security assignments do not specify which database structures are accessible to the different specified roles, and wherein the different security assignments do not specify which types of access are allowable for the one or more database structures that are accessible to the different specified roles; wherein the one or more database structures that are accessible to the different specified roles and the one or more types of access that are allowable for the one or more database structures that are accessible to the different specified roles are determined by roles persistently assigned in the database to the different specified users.

16. A system comprising:

one or more processors;

one or more non-transitory computer-readable media storing instructions, which, when executed by the system, cause the system to perform a set of actions including:

accessing a user request on behalf of a user for one or more types of access to one or more database structures of a database;

requesting, from an authorization service, one or more predicates that are persistently mapped, in one or more predicate database structures, to one or more roles persistently assigned, in a role assignment database structure, to the user and stored in association with at least one type of access of the one or more types of access and at least one database structure of the one or more database structures; wherein the one or more predicates indicate the at least one type of access and the at least one database structure for which the one or more roles of the user provide at least one of the one or more types of access;

using the one or more predicates from the authorization service to retrieve, from a security assignment database structure, a security assignment for the user relative to the at least one database structure of the one or more database structures of the database, wherein the security assignment assigns, to one or more security assignment fields, one or more security assignment values corresponding to one or more records of the at least one database structure accessible to the user, wherein the security assignment restricts access to the at least one database structure at least in part by preventing access one or more other records that do not have the one or more security assignment values for the one or more security assignment fields, wherein the one or more other records are otherwise accessible under the one or more roles;

using the at least one type of access for the at least one database structure further restricted by the security assignment, retrieving, in a database session for a base user with more access than the user, a result set from the one or more database structures at least in part by specifying one or more conditions in a query that selects data from the one or more database structures where the one or more security assignment fields match the one or more security assignment values, wherein the one or more conditions in the query exclude data from the one or more database structures where the one or more security assignment fields do not match the one or more security assignment values; and transmitting at least part of the result set to a client consumer system for consumption via a consumer interface.

17. The system of claim 16, wherein the one or more predicates are dynamically filled in by the database in the database session for the base user with the one or more security assignment fields and the one or more security assignment values pursuant to retrieving the security assignment, and wherein the one or more conditions in the query that selects the data from the one or more database structures comprise the one or more security assignment fields and the one or more security assignment values.

18. The system of claim 16, wherein the user is a first user, the user request is a first user request, the one or more types are one or more first types, the one or more predicates are one or more first predicates, the one or more roles are one or more first roles, the security assignment is a first security assignment, the one or more security assignment fields are one or more first security assignment fields, the one or more security assignment values are one or more first security assignment values, the result set is a first result set, the one or more conditions are one or more first conditions, the query is a first query, and the client device is a first client device, wherein the set of actions further includes:

accessing a second user request on behalf of a second user for one or more second types of access to the one or more database structures;

retrieving a second result set from the one or more database structures for the second user in a second query that selects data from the one or more database structures without specifying any security assignments that restrict the second result set beyond one or more second roles of the second user, wherein the database excludes data from the second result set based at least in part on the one or more second roles of the second user;

transmitting at least part of the second result set to a second client consumer system for consumption via a second consumer interface.

19. The system of claim 16, wherein the set of actions further includes:

causing display of a user interface for creating or modifying one or more security assignments for one or more specified users using a specified security assignment value for a specified security assignment field, wherein the user interface does not provide an option to modify types of access that apply to the created or modified one or more security assignments, and wherein the types of access that apply to the created or modified one or more security assignments are determined by roles persistently assigned in the database to the one or more specified users.

20. The system of claim 16, wherein the set of actions further includes:

causing display of a user interface for managing different security assignments, wherein at least some of the different security assignments include different specified users, different specified security assignment fields, different specified security assignment values, and different specified roles; wherein the different security assignments do not specify which database structures are accessible to the different specified roles, and wherein the different security assignments do not specify which types of access are allowable for the one or more database structures that are accessible to the different specified roles; wherein the one or more database structures that are accessible to the different specified roles and the one or more types of access that are allowable for the one or more database structures that are accessible to the different specified roles are determined by roles persistently assigned in the database to the different specified users.

\* \* \* \* \*